(12) United States Patent
Joshi et al.

(10) Patent No.: US 9,185,422 B2
(45) Date of Patent: Nov. 10, 2015

(54) VARIABLE LOCALIZED BIT-DEPTH INCREASE FOR FIXED-POINT TRANSFORMS IN VIDEO CODING

(75) Inventors: Rajan L. Joshi, San Diego, CA (US); Wei-Jung Chien, San Diego, CA (US); Marta Karczewicz, San Diego, CA (US); Yuriy Reznik, Seattle, WA (US); Peisong Chen, San Diego, CA (US); Hsiao-Chiang Chuang, West Lafayette, IN (US)

(73) Assignee: QUALCOMM Incorporated, San Diego, CA (US)

( * ) Notice: Subject to any disclaimer, the term of this patent is extended or adjusted under 35 U.S.C. 154(b) by 899 days.

(21) Appl. No.: 13/159,063

(22) Filed: Jun. 13, 2011

(65) Prior Publication Data
US 2012/0014455 A1 Jan. 19, 2012

Related U.S. Application Data

(60) Provisional application No. 61/364,784, filed on Jul. 15, 2010, provisional application No. 61/370,760, filed on Aug. 4, 2010.

(51) Int. Cl.
*H04N 7/12* (2006.01)
*H04N 19/42* (2014.01)
(Continued)

(52) U.S. Cl.
CPC ............. *H04N 19/42* (2014.11); *H04N 19/122* (2014.11); *H04N 19/157* (2014.11);
(Continued)

(58) Field of Classification Search
CPC ....................................................... H04N 19/43

USPC .................................................... 375/240.18
See application file for complete search history.

(56) References Cited

U.S. PATENT DOCUMENTS 8,607,023 B1 12/2013 Kraipak et al.
2003/0078953 A1 4/2003 Hallapuro et al.
(Continued)

FOREIGN PATENT DOCUMENTS

WO 2008002881 A2 1/2008

OTHER PUBLICATIONS

Karczewicz, et al., "Video Coding Technology Proposal by Qualcomm Inc," JCTVC-A121, JCT-VC Meeting, Dresden, DE, Apr. 15-23, 2010, 24 pp.
(Continued)

*Primary Examiner* — Richard Torrente
(74) *Attorney, Agent, or Firm* — Shumaker & Sieffert, P.A.

(57) ABSTRACT

This disclosure describes techniques for mitigating rounding errors in a fixed-point transform associated with video coding by applying a variable localized bit-depth increase at the transform. More specifically, the techniques include selecting a constant value based on a size of a fixed-point transform in a video coding device and applying a variable localized bit-depth increase at the transform with a value equal to the constant value. Applying the variable localized bit-depth increase includes left-shifting a transform input signal by a number of bits equal to the constant value before the fixed-point transform, and right-shifting a transform output signal by a number of bits equal to the constant value after the fixed-point transform. The constant value is selected from a plurality of constant values stored on the video coding device. Each of the constant values is pre-calculated for one of a plurality of different transform sizes supported by the video coding.

41 Claims, 9 Drawing Sheets

(51) Int. Cl.
| | |
|---|---|
| *H04N 19/176* | (2014.01) |
| *H04N 19/46* | (2014.01) |
| *H04N 19/196* | (2014.01) |
| *H04N 19/122* | (2014.01) |
| *H04N 19/61* | (2014.01) |
| *H04N 19/60* | (2014.01) |
| *H04N 19/157* | (2014.01) |
| *H04N 19/184* | (2014.01) |

(52) U.S. Cl.
CPC .......... *H04N 19/176* (2014.11); *H04N 19/184* (2014.11); *H04N 19/196* (2014.11); *H04N 19/46* (2014.11); *H04N 19/60* (2014.11); *H04N 19/61* (2014.11)

(56) References Cited

U.S. PATENT DOCUMENTS

| | | | |
|---|---|---|---|
| 2007/0081734 A1* | 4/2007 | Sullivan et al. | 382/250 |
| 2007/0168410 A1* | 7/2007 | Reznik | 708/490 |
| 2007/0196025 A1 | 8/2007 | Tran et al. | |
| 2007/0297502 A1 | 12/2007 | Reznik | |
| 2009/0150469 A1 | 6/2009 | Zheng et al. | |

OTHER PUBLICATIONS

Honggang Qi et al: "Adaptive Block-Size Transform Based on Extended Integer 8/8/4/4 Transforms for H. 264/AVCN", Image Processing, 2006 IEEE International Conference on, IEEE, PI, Oct. 1, 2006, pp. 1341-1344, XP031048893, ISBN: 978-1-4244-0480-3 the whole document.
I-K Kim et al: "CE10: Fast integer transform based on modified Loeffler's factorization", 5. JCT-VC Meeting; 96. MPEG Meeting; Mar. 16, 2011-Mar. 23, 2011; Geneva;(Joint Collaborative Team on Video Coding of ISO/IEC JTC1/SC29/WG11AND ITU-T SG.16); URL:http://wftp3.itu.int/av-arch/jctvc-site/, No. JCTVC-E277, Mar. 10, 2011, XP030008783, ISSN: 0000-0007 the whole document.
International Search Report and Written Opinion—PCT/US2011/043462—ISA/EPO—Dec. 1, 2011.
Joshi R et al: "CE10: Scaled orthogonal integer transforms supporting recursive factorization structure", 5. JCT-VC Meeting; 96. MPEG Meeting; Mar. 16, 2011-Mar. 23, 2011; Geneva ;(Joint Collaborative Team on Video Coding of ISO/IECJTC1/ SC29/WG11AND ITU-T SG. 16); URL:http://wftp3.itu.int/av-arch/jc tvc-site/, No. JCTVC-E370, Mar. 11, 2011, XP030008876, ISSN: 0000-0005 the whole document.
Joshi R et al: "Simplified Transforms for Extended Block Sizes", 38. VCEG Meeting; 89. MPEG Meeting; Jan. 7, 2009-Aug. 7, 2009; London, Geneva; (Video Coding Experts Group of ITU-T SG.16), No. VCEG-AL30, Jul. 3, 2009, XP030003711, ISSN: 0000-0084 the whole document.
Mathias Wien: "Variable Block-Size Transforms for Hybrid Video Coding", Dissertation Der Rheinisch-Westfaelischen Technischen Hochschule Aachen, Feb. 3, 2004, pp. 1-183, XP002481661, [retrieved on Feb. 3, 2004] p. 63-p. 122.
Reznik Y A et al: "Low Complexity Fixed-Point Approximation of Inverse Discrete Cosine Transform", 2007 IEEE International Conference on Acoustics, Speech, and Signal Processing Apr. 15-20, 2007 Honolulu, HI, USA, IEEE , Piscataway, NJ, USA, Apr. 15, 2007, XP031463060, ISBN: 978-1-4244-0727-9 the whole document, 4 pp.
Yuriy A Reznik et al: "Low-Drift Fixed-Point 8×8 IDCT Approximation with 8-Bit Transform Factors" Image Processing, 2007. ICIP 2007. IEEE International Conference on, IEEE, PI, Sep. 1, 2007, pp. VI-81, XP031158267, ISBN: 978-1-4244-1436-9 the whole document.
Yuriy A Reznik et al: "On design of transforms for high-resolution/ high-performance video coding", 88. MPEG Meeting; Apr. 20, 2009-Apr. 24, 2009; Maui; (Motion Picture Expert Group or ISO/IEC JTC1/SC29/WG11), No. M16438, Apr. 17, 2009, XP030045035, the whole document.
Bross et al., "High efficiency video coding (HEVC) text specification draft 6," Joint Collaborative Team on Video Coding, JCTVC-H1003, Nov. 21-30, 2011, 259 pp.
Bross et al., "High efficiency video coding (HEVC) text specification draft 7," Joint Collaborative Team on Video Coding, JCTVC-I1003_D2, Apr. 27-May 7, 2012, 290 pp.
Bross et al., "High efficiency video coding (HEVC) text specification draft 8," Joint Collaborative Team on Video Coding, JCTVC-J1003_D7, Jul. 11-20, 2012, 261 pp.
Bross et al., "WD4: Working Draft 4 of High-Efficiency Video Coding," Joint Collaborative Team on Video Coding, JCTVC-F803_d2, Jul. 14-22, 2011, 226 pp.
Bross et al., "WD5: Working Draft 5 of High-Efficiency Video Coding," Joint Collaborative Team on Video Coding, JCTVC-G1103_d2, Nov. 21-30, 2011, 214 p.
International Preliminary Report on Patentability—PCT/US2011/043462, The International Bureau of WIPO—Geneva, Switzerland, Sep. 21, 2012, 9 pp.
International Telecommunication Union, "Advanced video coding for generic audiovisual services," Standardization Sector of ITU, Jun. 2011, 674 pp.
Reply to written opinion dated Dec. 1, 2011, from international application No. PCT/US2011/043462, filed Mar. 15, 2012, 7 pp.
Second Written Opinion from international patent application No. PCT/US2011/043462, dated Jun. 28, 2012, 7 pp.
Wiegand et al., "WD2: Working Draft 2 of High-Efficiency Video Coding", Joint Collaborative Team on Video Coding, JCTVC-D503, Jan. 20-28, 2011, 153 pp.
Wiegand et al., "WD3: Working Draft 3 of High-Efficiency Video Coding," Joint Collaborative Team on Video Coding, JCTVC-E603, Mar. 16-23, 2011,193 pp.
Wiegand et al.,"WD1: Working Draft 1 of High-Efficiency Video Coding", Joint Collaborative Team on Video Coding, JCTVC-C403, Oct. 7-15, 2010, 137 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
Joshi et al., "Efficient 16 and 32-point transforms," Joint Collaborative Team on Video Coding (JCT-VC) of ITU-T SG16 WP3 and ISO 6G16 WP3 and ISO/IEC JTC1/SC29/WG11, 4th Meeting: Daegu, KR, Jan. 20-28, 2011, 8 pp.
Karczewicz et al., "Rounding Controls for Bidirectional Averaging," Joint Collaborative Team on Video Coding (JCT-VC) of ITU-T SG16 WP3 and ISO/IEC JTC1/SC29/WG11, 2nd Meeting: Geneva, CH, Jul. 21-28, 2010, 3 pp.
Reznik et al., "Efficient fixed-point approximations of the 8×8 inverse discrete cosine transform," Proc. SPIE vol. 6696, Applications of Digital Image Processing, pp. 669617-1-669617-17, Sep. 24, 2007.
Chen et al., "A fast computational algorithm for the discrete cosine transform," IEEE Trans. on Communications, vol. COM-25, No. 9, pp. 1004-1009, Sep. 1977.
Malvar H.S., et al., "Low-Complexity Transform and Quantization in H.264/AVC," IEEE Transactions on Circuits and Systems for Video Technology, Jul. 2003, pp. 598-603, vol. 13 (7), XP011099252, ISSN: 1051-8215, DOI: 10.1109/TCSVT.2003.814964.
Xin J., et al., "Converting DCT Coefficients to H.264/AVC", TR2004-058, Mitsubishi Electric Research Laboratories, Jun. 2004, 11 pages.

\* cited by examiner

VARIABLE LOCALIZED BIT-DEPTH INCREASE FOR FIXED-POINT TRANSFORMS IN VIDEO CODING

This application claims the benefit of U.S. Provisional Application No. 61/364,784, filed Jul. 15, 2010, which is hereby incorporated by reference in its entirety. This application also claims the benefit of U.S. Provisional Application No. 61/370,760, filed Aug. 4, 2010, which is hereby incorporated by reference in its entirety.

TECHNICAL FIELD

This disclosure relates to video coding and, more particularly, fixed-point transforms in video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), or proposed ITU-T H.265, High Efficiency Video Coding (HEVC), and extensions of such standards, to transmit and receive digital video information more efficiently.

Video compression techniques may perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B or Generalized P/B) frame or slice may use spatial prediction with respect to neighboring macroblocks in the same frame or slice or temporal prediction with respect to other reference frames.

The video compression techniques may also perform linear transforms to represent residual video block data, which is the difference between a video block of a current frame to be coded and a predictive video block of a reference frame, in an efficient manner for coding. In some cases, the video coding devices may use fast implementations of linear transforms that are performed using cascaded butterfly structures. The number of cascaded butterfly structures used to represent a transform depends on the size of the transform. In order to reduce computational complexity within video coding devices, linear transforms may be implemented as fixed-point transforms instead of floating point transforms. Fixed-point implementations, however, may introduce rounding errors at each of the cascaded levels of butterfly structures used to represent the transform. In the case of fixed-point transforms, therefore, the cumulative rounding error increases with the size of the transform.

SUMMARY

This disclosure describes techniques for mitigating rounding errors in a fixed-point transform associated with video coding by applying a variable localized bit-depth increase at the transform. More specifically, the techniques include selecting a constant value based on a size of a fixed-point transform in a video coding device and applying a variable localized bit-depth increase at the transform with a value equal to the constant value. The techniques for applying the variable localized bit-depth increase include left-shifting a transform input signal by a number of bits equal to the constant value before the fixed-point transform, and right-shifting a transform output signal by a number of bits equal to the constant value after the fixed-point transform.

According to the techniques, the constant value for the size of the fixed-point transform is selected from a plurality of constant values for a plurality of different transform sizes stored on the video coding device. Each of the constant values is pre-calculated for one of the plurality of different transform sizes supported by the video coding. The fixed-point transform may introduce a rounding error in the transform output signal due to a loss of bit-depth that is dependent on the size of the transform. Applying the variable localized bit-depth increase at the fixed-point transform provides a higher bit-depth transform input signal for transformation. Moreover, applying the variable localized bit-depth increase with a value calculated based on the size of the fixed-point transform may reduce or eliminate the rounding error due to the fixed-point implementation of the transform.

In one example, this disclosure is directed to a method of coding a video signal, the method comprising storing a plurality of constant values, wherein each of the constant values is associated with one of a plurality of different transform sizes associated with video coding, and selecting one of the constant values based on a size of a fixed-point transform in a video coding device. The method further includes applying, in the video coding device, a variable localized bit-depth increase at the fixed-point transform with a value equal to the constant value by left-shifting a transform input signal by a number of bits equal to the constant value before the fixed-point transform, and right-shifting a transform output signal by a number of bits equal to the constant value after the fixed-point transform.

In another example, this disclosure is directed to a video coding device for coding a video signal, the video coding device comprising a memory that stores a plurality of constant values, wherein each of the constant values is associated with one of a plurality of different transform sizes associated with video coding, and a processor that selects one of the constant values based on a size of a fixed-point transform in the video coding device, and applies a variable localized bit-depth increase at the fixed-point transform with a value equal to the constant value by left-shifting a transform input signal by a number of bits equal to the constant value before the fixed-point transform, and right-shifting a transform output signal by a number of bits equal to the constant value after the fixed-point transform.

In a further example, this disclosure is director to a video coding device for coding a video signal, the video coding device comprising means for storing a plurality of constant values, wherein each of the constant values is associated with one of a plurality of different transform sizes associated with video coding, and means for selecting one of the constant values based on a size of a fixed-point transform in the video coding device. The video coding device further includes means for applying a variable localized bit-depth increase at the fixed-point transform with a value equal to the constant value by left-shifting a transform input signal by a number of bits equal to the constant value before the fixed-point transform, and right-shifting a transform output signal by a number of bits equal to the constant value after the fixed-point transform.

In another example, this disclosure is directed to a computer-readable storage medium comprising instruction for coding a video signal that, upon execution in a processor, cause the processor to store a plurality of constant, wherein each of the constant values is associated with one of a plurality of different transform sizes associated with video coding, select one of the constant values based on a size of a fixed-point transform in a video coding device, and apply, in the video coding device, a variable localized bit-depth increase at the fixed-point transform with a value equal to the constant value by left-shifting a transform input signal by a number of bits equal to the constant value before the fixed-point transform, and right-shifting a transform output signal by a number of bits equal to the constant value after the fixed-point transform.

The details of one or more examples are set forth in the accompanying drawings and the description below. Other features, objects, and advantages will be apparent from the description and drawings, and from the claims.

DETAILED DESCRIPTION

Techniques are described in this disclosure for mitigating rounding errors introduced by a fixed-point implementation of a transform associated with video coding by applying a variable localized bit-depth increase at the transform. More specifically, the techniques include selecting a constant value based on a size of the fixed-point transform in a video coding device and applying the variable localized bit-depth increase at the transform with a value equal to the constant value. The techniques for applying the variable localized bit-depth increase include left-shifting a transform input signal by a number of bits equal to the constant value before the fixed-point transform, and right-shifting a transform output signal by a number of bits equal to the constant value after the fixed-point transform. The constant value for the size of the fixed-point transform is selected from a plurality of constant values for a plurality of different transform sizes stored on the video coding device. Each of the constant values is pre-calculated for one of the plurality of different transform sizes supported by the video coding.

Figure 1:
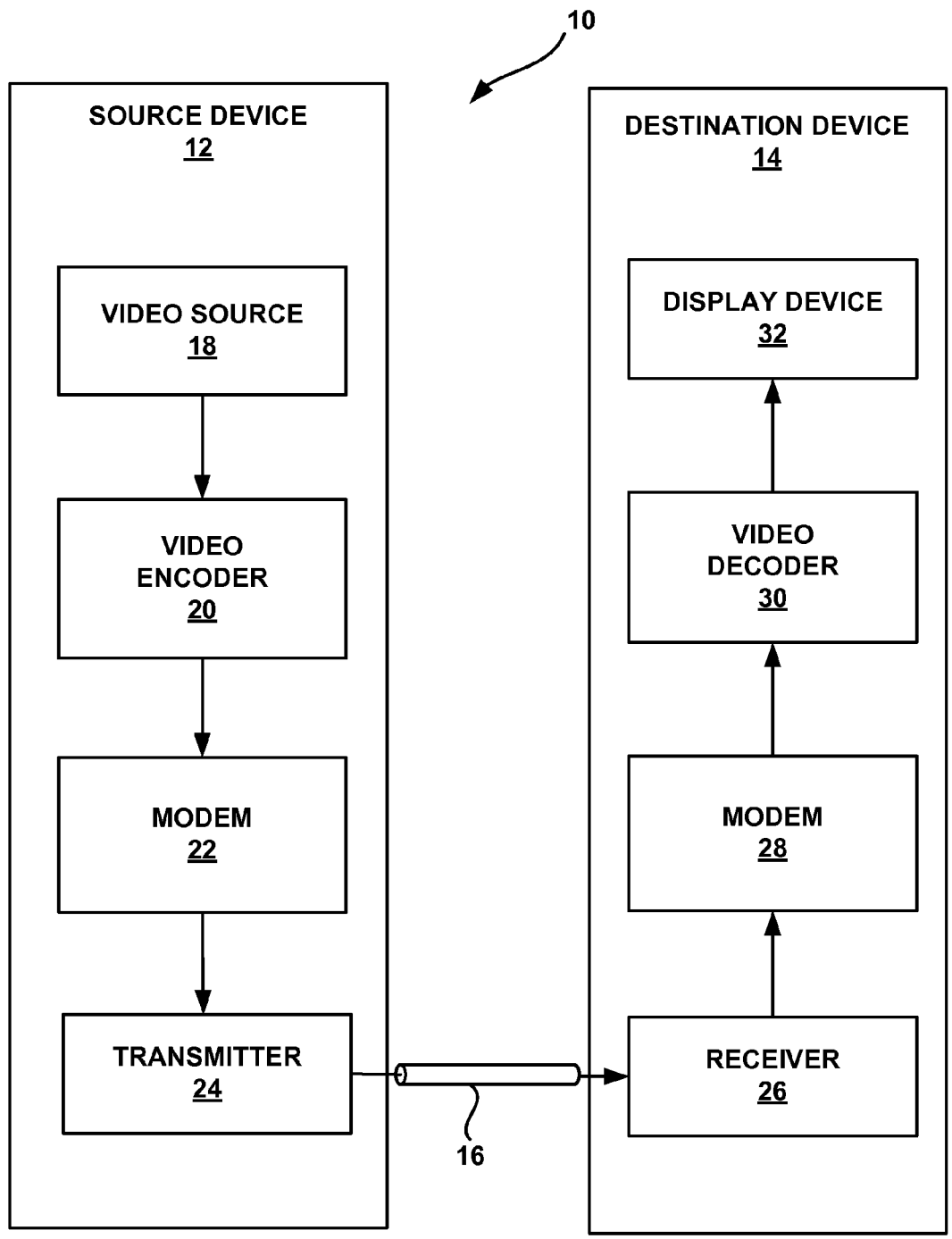
FIG. 1 is a block diagram illustrating an example video encoding and decoding system that may utilize techniques for applying variable localized bit-depth increases at fixed-point transforms associated with a video encoder of a source device and a video decoder of a destination device within the system.

FIG. 1 is a block diagram illustrating an example video encoding and decoding system 10 that may utilize techniques for applying variable localized bit-depth increases at fixed-point transforms associated with a video encoder 20 of a source device 12 and a video decoder 30 of a destination device 14 within system 10. The values of the variable localized bit-depth increases are pre-calculated for a plurality of different transform sizes and stored on video encoder 20 and video decoder 30. The appropriate variable localized bit-depth increases may then be selected by video encoder 20 and video decoder 30 based on the sizes of the respective fixed-point transforms. In this way, the variable localized bit-depth increases may mitigate rounding errors introduced by the fixed-point implementations of the specific transforms within system 10.

As shown in FIG. 1, system 10 includes a source device 12 that transmits encoded video to a destination device 14 via a communication channel 16. Source device 12 and destination device 14 may comprise any of a wide range of devices, including digital televisions, digital direct broadcast systems, wireless broadcast systems, personal digital assistants (PDAs), laptop or desktop computers, tablet computers, digital cameras, digital recording devices, digital media players, video gaming devices, video game consoles, cellular or satellite radio telephones, video teleconferencing devices, and the like. In some cases, source device 12 and destination device 14 may comprise wireless communication devices that can communicate video information over a communication channel 16, in which case communication channel 16 is wireless.

The techniques of this disclosure, however, which concern applying variable localized bit-depth increases at fixed-point transforms associated with video coding, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless or wired media suitable for transmission of encoded video data.

In the example of FIG. 1, source device 12 includes a video source 18, video encoder 20, a modulator/demodulator (modem) 22 and a transmitter 24. Destination device 14 includes a receiver 26, a modem 28, a video decoder 30, and a display device 32. In accordance with this disclosure, video encoder 20 of source device 12 may be configured to perform the techniques for applying a variable localized bit-depth increase at a fixed-point transform associated with video encoder 20 by selecting a constant value based on a size of the fixed-point transform from a plurality of constant values stored on video encoder 20, and applying the variable localized bit-depth increase at the transform with a value equal to the constant value. Moreover, video decoder 30 of destination device 14 may be similarly configured to perform the techniques for applying a variable localized bit-depth increase at a fixed-point inverse transform associated with video decoder 30. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for applying variable localized bit-depth increases at fixed-point transforms associated with video coding may be performed by any digital video encoding and/or decoding device. The techniques of this disclosure may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 28 demodulates the information. The information communicated over channel 16 may include syntax information defined by video encoder 20, which is also used by video decoder 30, that includes syntax elements that describe characteristics and/or processing of macroblocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the ITU-T H.264 standard, alternatively referred to as MPEG-4, Part 10, Advanced Video Coding (AVC), or the emerging next generation video coding standard, referred to as High Efficiency Video Coding (HEVC). The techniques of this disclosure, however, are not limited to any particular coding standard. Other examples include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder 20 typically operates on video blocks within individual video frames in order to encode the video data. A video block may correspond to a macroblock or a partition of a macroblock. For example, block sizes that are less than the size of a macroblock may be referred to as partitions of the macroblock. The video blocks may have fixed or varying sizes, and may differ in size according to a specified coding standard. Each video frame may include a plurality of slices. Each slice may include a plurality of macroblocks, which may be arranged into partitions, also referred to as sub-blocks.

As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. The HEVC standard may support intra and inter prediction in block sizes up to 32×32, 64×64 or 128×128. The HEVC standard provides more efficient and flexible video coding based on coding units (CU), prediction units (PU), and transform units (TU). A CU is a basic unit of compression similar to a macroblock used in the H.264 standard. In HEVC, CU sizes up to 32×32, 64×64 or even 128×128 are supported in order to compress high-definition video content effectively. A PU is a unit of inter/intra prediction and there can be multiple PUs in a single CU. A TU is a unit of transform, and can include one or more PUs. In addition to conventional 4×4 and 8×8 transforms, 16×16, 32×32, 64×64, and 128×128 integer transforms may be supported for TUs. In addition, rectangular transform may also be supported for TUs, including 4×8, 8×4, 8×16, 16×8, 16×32, 32×16, 32×64, 64×32, 64×128, and 128×64.

In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Video blocks may comprise blocks of pixel data in the pixel domain, or blocks of transform coefficients in the transform domain following application of a transform to the residual video block data representing pixel differences between coded video blocks and predictive video blocks. In some cases, a video block may comprise blocks of quantized transform coefficients in the transform domain following application of a quantizer to the transform coefficients output from the transform.

Smaller video blocks can provide better resolution, and may be used for locations of a video frame that include high levels of detail. In general, macroblocks and the various partitions, sometimes referred to as sub-blocks, may be considered video blocks. In addition, a slice may be considered to be a plurality of video blocks, such as macroblocks and/or sub-blocks. Each slice may be an independently decodable unit of a video frame. Alternatively, frames themselves may be decodable units, or other portions of a frame may be defined as decodable units. The term coding unit of CU, described above, may refer to any independently decodable unit of a video frame such as an entire frame, a slice of a frame, a group of pictures (GOP) also referred to as a sequence, or another independently decodable unit defined according to applicable coding techniques.

Following intra-predictive or inter-predictive coding to produce predictive data and residual data, transformation of the residual data may be performed to generate residual transform coefficients that represent the residual data in a more efficient manner for coding. The transforms may comprise forward or inverse discrete cosine transforms (DCT), integer transforms, wavelet transforms, or another conceptually similar linear transforms. In some cases, the transforms may have fast implementations performed using a number of cascaded butterfly structures relative to a size of the transform. Moreover, to reduce computational complexity, the transforms may have fixed-point implementations. A fixed point transform, however, may introduce rounding errors in the transform output signal. This may happen when the cascaded butterfly stages right-shift the transform output signal by a number of bits with or without rounding. For example, an n-bit value may be right-shifted to an m-bit value during fixed-point transformation, where n is greater than m. The amount of bit loss typically depends on the number of cascaded butterfly stages corresponding to the size of the transform.

In accordance with the techniques of this disclosure, video encoder 20 and/or video decoder 30 may mitigate rounding errors in a fixed-point transform by applying a variable localized bit-depth increase at the transform. More specifically, the techniques include selecting a constant value based on a size of the fixed-point transform, and applying the variable localized bit-depth increase at the transform with a value equal to the constant value. The variable localized bit-depth increase is applied by left-shifting a transform input signal by a number of bits equal to the constant value before the fixed-point transform, and then right-shifting a transform output signal by a number of bits equal to the constant value after the fixed-point transform. The constant value for the size of the fixed-point transform may be selected from a plurality of constant values stored on video encoder 20 and/or video decoder 30. Each of the constant values is pre-calculated for one of a plurality of different transform sizes supported by the video coding.

Typically, fixed-point transforms associated with video coding comprise two dimensional transforms. As an example, the two dimensional transform may be performed by applying a first stage one dimensional transform to the rows of pixel data within a video block, and then applying a second stage one dimensional transform to the columns of pixel data within the video block, or vice versa. The techniques of this disclosure, therefore, may include selecting a constant value based on a size of one stage of the two dimensional fixed-point transform, doubling the constant value, and applying a variable localized bit-depth increase at the two dimensional transform with a value less than or equal to the doubled constant value. In other examples, a localized bit-depth increase may be applied at each stage of the two dimensional transform with a value equal to the constant value selected for one stage of the two dimensional transform.

According to the techniques, a different constant value is pre-calculated for each different transform size supported by the video coding standard. For example, the ITU-T H.264 (AVC) standard may support transforms of sizes 4×4 and 8×8. The emerging HEVC standard may support transforms including 4×4, 4×8, 8×4, 8×8, 8×16, 16×8, 16×16, 16×32, 32×16, 32×32, 32×64, 64×32, 64×64, 64×128, 128×64, or 128×128 for TUs. The plurality of constant values may then be stored in video encoder 20 and/or video decoder 30, and the appropriate one of the constant values may be selected based on a size of the fixed-point transform to be applied in video encoder 20 and/or video decoder 30. Applying the variable localized bit-depth increase at the fixed-point transform provides higher bit-precision in the transform input signal to offset the loss of bit-depth during the transformation. Moreover, applying the variable localized bit-depth increase with a value calculated based on the size of the fixed-point transform reduces or eliminates the rounding error due to right-shifting the transform output signal by a number of cascaded butterfly stages corresponding to the size of the transform.

In one example, video encoder 20 and/or video decoder 30 may selectively apply a localized variable bit-depth increase at the fixed-point transform associated with video coding based on a size of the TU for a given CU of the video frame or slice to be encoded. For example, the localized variable bit-depth increase may be applied at the transform when the TU is relatively large, such as 32×32, 64×64, or 128×128, but not applied when the TU is small, such as 4×4 or 8×8.

In some examples, video encoder 20 may apply an internal bit-depth increase (IBDI) to a video signal received from video source 18 before performing any video block coding. For example, video encoder 20 may increase a bit-depth of the video signal from its input bit-depth of 8 bits to 12 bits in order to perform higher bit-precision video coding. Video encoder 20 may increase the bit-depth of the video signal and video decoder 30 may subsequently reduce the bit-depth of the reconstructed video signal back to its input bit-depth. In this case, according to the techniques, the constant value selected based on the size of the fixed-point transform may be adjusted based on a value of the IBDI. For example, when an IBDI is applied to the video signal, then the constant value selected based on the size of the fixed-point transform may be reduced by the value of the IBDI. If the value of the IBDI is greater than the constant value such that the reduction would result in a negative value for the variable localized bit-depth increase, however, the constant value is reduced to zero and no variable localized bit-depth increase is applied at the fixed-point transform.

Following the transform, quantization of transform coefficients may be performed. Quantization generally refers to a process in which transform coefficients are quantized to possibly reduce the amount of data used to represent the coefficients. The quantization process may also reduce the bit depth associated with some or all of the coefficients. Following quantization, entropy coding of the quantized data may be performed, e.g., according to content adaptive variable length coding (CAVLC), context adaptive binary arithmetic coding (CABAC), or another entropy coding methodology. A processing unit configured for entropy coding, or another processing unit, may perform other processing functions, such as zero run length coding of quantized coefficients and/or generation of syntax information such as coded block pattern (CBP) values, macroblock type, coding mode, maximum macroblock size for a coded unit (such as a frame, slice, macroblock, or sequence), or the like.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame. When an IBDI is applied to the video signal, video encoder 20 may explicitly signal a value of the IBDI to video decoder 30 such that video decoder 30 may remove the IBDI to bring the decoded video signal back to its input bit-depth. In some examples, video encoder 20 may also explicitly signal information to video decoder 30 regarding the constant value selected for the variable localized bit-depth increase at the inverse transform.

In this disclosure, the term "coding" refers to encoding or decoding. Similarly, the term "coder" generally refers to any video encoder, video decoder, or combined encoder/decoder (CODEC). Accordingly, the term "coder" is used herein to refer to a specialized computer device or apparatus that performs video encoding or video decoding. The techniques of this disclosure may be applicable to encoders or decoders. For example, each of video encoder 20 and video decoder 30 may be included in a respective camera, computer, mobile device, subscriber device, broadcast device, set-top box, server, or the like. Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof.

Figure 2:
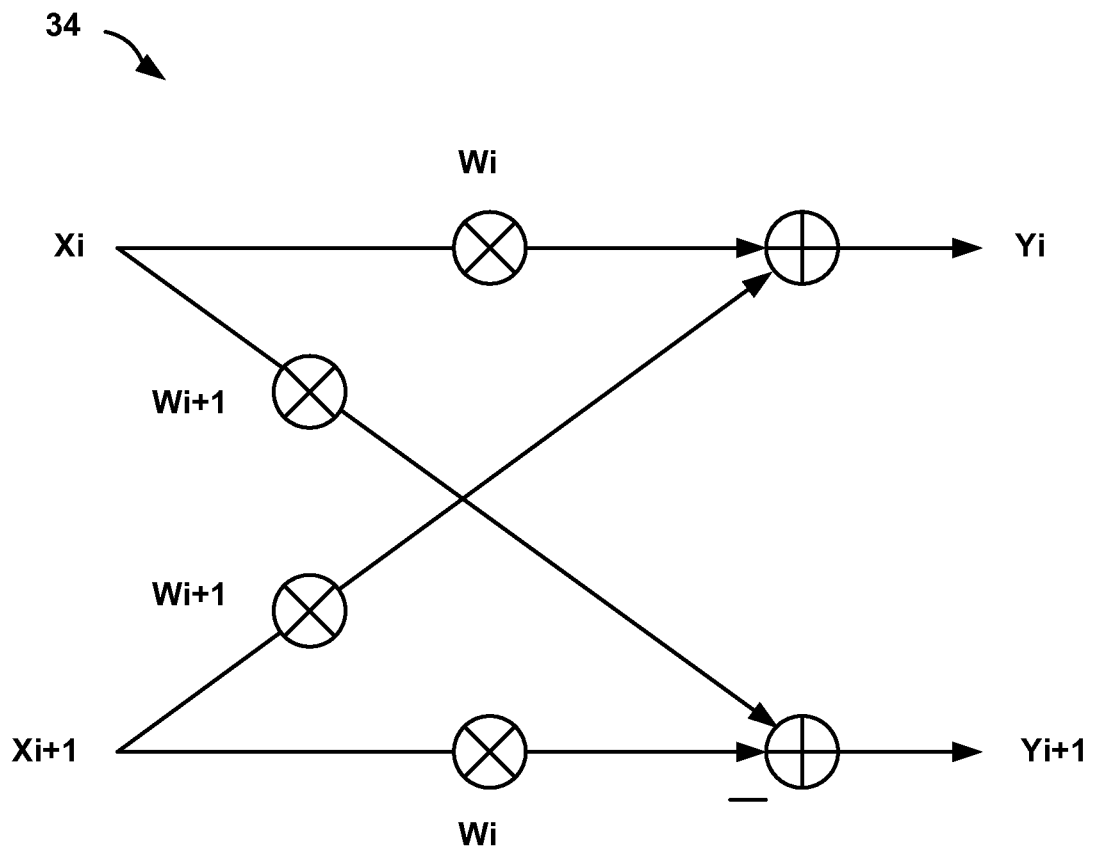
FIG. 2 is a conceptual diagram illustrating a butterfly structure for a transform associated with video coding.

FIG. 2 is a conceptual diagram illustrating a butterfly structure 34 for a transform associated with video coding. As described above, transforms associated with video coding may have fast implementations within a video coding device, such as video encoder 20 or video decoder 30 of FIG. 1. Such fast implementations of transforms may be performed using a number of cascaded butterfly structures relative to a size of the transform. Butterfly structure 34 illustrated in FIG. 2 is an example of one such butterfly structure. In the case of a one dimensional 16-point transform, for example, the transform may be represented by multiple cascaded butterfly structures similar to butterfly structure 34 (see FIG. 3). The transform at least partially represented by butterfly structure 34 may comprise a forward discrete cosine transform (DCT), integer transform, wavelet transform, or another conceptually similar linear transform.

The portion of a transform implemented by butterfly structure 34 may be represented by the following equations:

$$Y_i = W_i^* X_i + W_{i+1}^* X_{i+1} \text{ and}$$

$$Y_{i+1} = W_{i+1}^* X_i - W_i^* X_{i+1},$$

where $X_i$ and $X_{i+1}$ are transform input values, $Y_i$ and $Y_{i+1}$ are transform output values, and $W_i$ and $W_{i+1}$ are weighting or multiplication factors. A transform input signal may be represented as $X=(X_0, X_1, X_2 \ldots X_M)$, and a transform output signal may be represented as $Y=(Y_0, Y_1, Y_2 \ldots Y_M)$. For example, in the case of video encoding, the transform input values may comprise pixel values of a residual video block, and the transform output values may comprise transform coefficients. In the case of video decoding, the transform input values may comprise dequantized transform coefficients, and the transform output values may comprise pixel values of a residual video block. In the case where the transform is a DCT, for example, the multiplication factors are sines and cosines. In cases of other transform types, the multiplication factors may take the form of integers, wavelets, or the like In order to reduce computational complexity within a video coding device, such as video encoder 20 or video decoder 30 of FIG. 1, transforms associated with video coding may be implemented as fixed point transforms instead of floating point transforms. In case of fixed point transforms, the multiplication factors may be integers or dyadic rationals. A dyadic rational is a rational number whose numerator is an integer and denominator is a power of 2. For example, in a fixed point implementation of the transform at least partially represented by butterfly structure 34, the multiplication factors may be approximated by dyadic rationals of the form $W_i = A/2^m$ and $W_{i+1} = B/2^m$, where A, B, and m are integers. In fixed-point, a division by $2^m$ can also be represented as a right-shift by m bits. The transform output values of butterfly structure 34, therefore, may be represented by the following equations:

$$Y_i = (A^* X_i + B^* X_{i+1}) >> m, \text{ and}$$

$$Y_{i+1} = (B^* X_i - A^* X_{i+1}) >> m,$$

where (>>m) represents a right-shift by m bits without rounding.

The right-shift in the fixed-point implementation of the transform introduces a rounding error or loss of bit-depth at each of the cascaded butterfly structures used to represent the transform. One additional reason for this loss of bit-depth is that the butterfly structure performs clipping instead of rounding. Clipping is performed because performing rounding at each butterfly stage can be computationally costly. The cumulative rounding error in the transform output signal of the fixed-point transform, therefore, increases with the size of the transform. The techniques in this disclosure mitigate the rounding errors in the fixed-point transform by applying a variable localized bit-depth increase at the input of the fixed-point transform.

Figure 3:
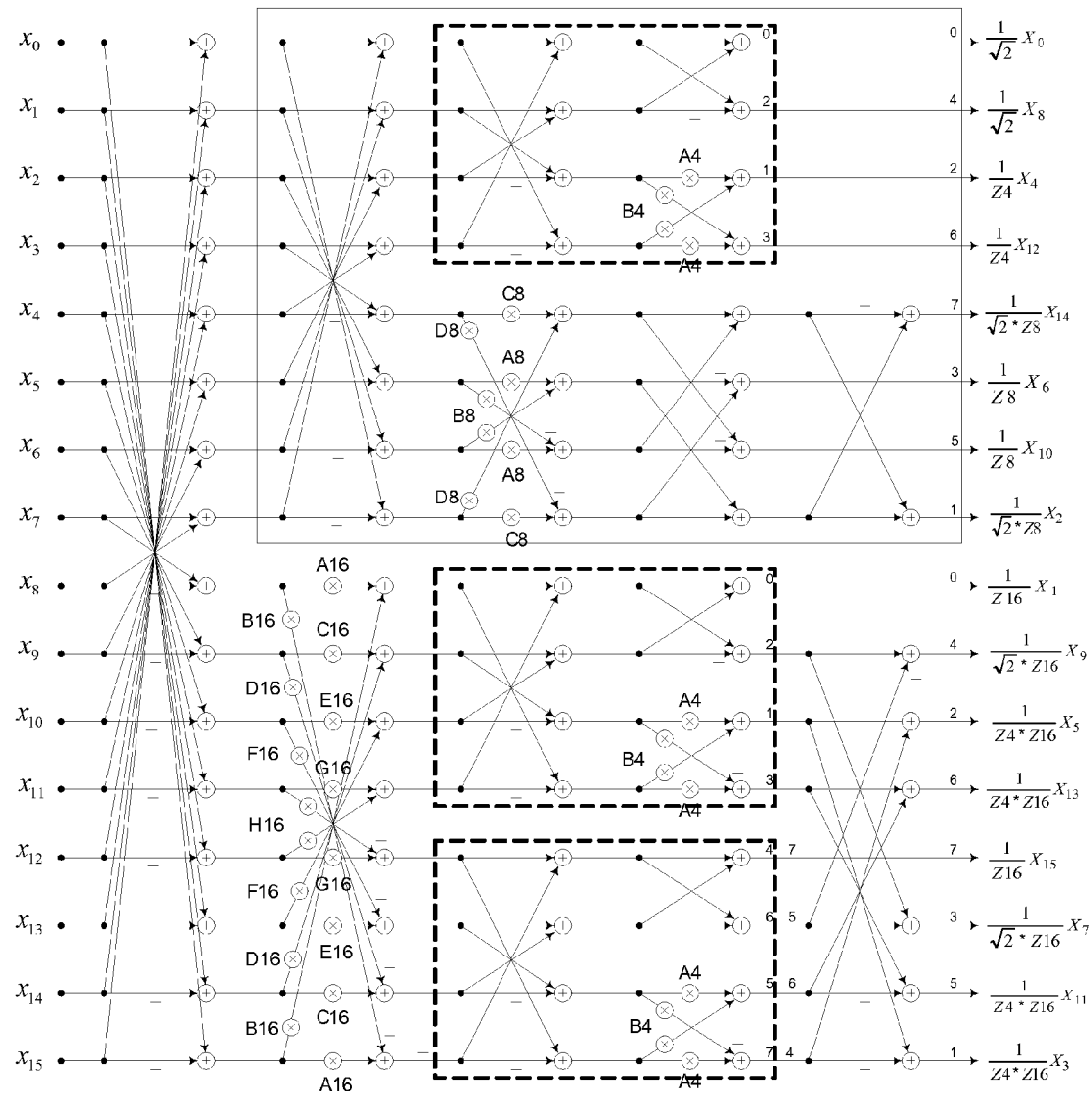
FIG. 3 is a conceptual diagram illustrating cascaded butterfly structures for a transform associated with video coding.

FIG. 3 is a conceptual diagram illustrating cascaded butterfly structures 36 for a transform associated with video coding. In one example, cascaded butterfly structures 36 may represent a one dimensional 16-point transform. Cascaded butterfly structures 36 are merely one exemplary representation of a transform. In other examples, many other variations and combinations of butterfly structures may be cascaded together to represent transforms. The transform represented by cascaded butterfly structures 36 may comprise a forward or inverse discrete cosine transform (DCT), integer transform, wavelet transform, or another conceptually similar linear transform.

In the illustrated example, cascaded butterfly structures 36 include multiple individual butterfly structures, similar to butterfly structure 34 of FIG. 2, cascaded together to represent a 16-point transform. For example, cascaded butterfly structures 36 include butterfly structures between pairs of transform input values $X_0$ through $X_{15}$. In addition, cascaded butterfly structures 36 use thirty-six multiplications to represent the 16-point transform. In other examples, cascaded butterfly structures 36 may include individual butterfly structures between different pairings of transform input values, between different numbers of transform input values, cascaded in different arrangements, and that perform different mathematical operations, e.g., addition or multiplication, with the transform input values.

As described above, a fixed-point implementation of the transform represented by cascaded butterfly structures 36 introduces a rounding error or loss of bit-depth at each of the individual butterfly structures due to right-shifting the transform output signal. One additional reason for this loss of bit-depth is that each of the butterfly structures performs clipping instead of rounding. In the illustrated example, the represented 16-point fixed-point transform, therefore, has a cumulative rounding error in its transform output signal that is dependent on the number of cascaded butterfly structures used to represent the transform. In other examples, the cumulative rounding error of the fixed-point transform may be even larger as video coding standards may support transforms of sizes up to 32×32, 64×64, or 128×128.

Moreover, as the size of the transform increases, the weighting or multiplication factors, e.g., $W_i=A/2^m$, at each of the butterfly structures may be reduced, which can be represented in the dyadic rationals as an increase in the value of m. The increased m value results in a larger right-shift at each of the butterfly structures of the fixed-point transform and, consequently, a larger cumulative rounding error. The associated loss of bit-depth at both the forward transform in a video encoding device and the inverse transform in a video decoding device may result in low bit-precision reconstructions of video blocks for display.

The techniques in this disclosure mitigate rounding errors in the fixed-point transform by applying a variable localized bit-depth increase to at the fixed-point transform. The techniques include selecting a constant value, N, based on a size of the fixed-point transform and applying the variable localized bit-depth increase at the fixed-point transform with a value equal to the constant value. The constant value may be selected from a plurality of constant values pre-calculated for a plurality of different transform sizes. Applying the variable localized bit-depth increase includes left-shifting the transform input signal, X, by a number of bits equal to the constant value before the fixed-point transform, and right-shifting the transform output signal, Y, by a number of bits equal to the constant value after the fixed-point transform.

When the variable localized bit-depth increase is applied at the fixed-point transform, the transform input signal may be represented as X'=X<<N, where (<<N) represents a left-shift by N bits, and the transform output signal may be represented as Y'=(Y+$2^{N-1}$)>>N, where $2^{N-1}$ represents an offset and (>>N) represents a right-shift by N bits. In other examples, different offsets may be applied to the transform output signal before the right-shift by N bits. In some cases, additional offsets and right-shifts may be applied to the transform output signal along with the variable localized bit-depth increase. In those cases, the offsets and right-shifts may be combined together. For example, if an additional offset has a value of $2^{M-1}$ and an additional right-shift has a value of M, then the combined offset may have a value equal to $2^{M+N-1}$ and the combined right-shift may have a value equal to (M+N).

Applying the variable localized bit-depth increase at the input of the fixed-point transform provides a higher bit-depth transform input signal for transformation. Moreover, applying the variable localized bit-depth increase with a value calculated based on the size of the fixed-point transform reduces or eliminates the rounding errors due to the fixed-point implementation of the transform.

As described above, cascaded butterfly structures 36 may represent a one dimensional 16-point transform. Typically, fixed-point transforms associated with video coding comprise two dimensional transforms. The two dimensional transform may be performed by applying a first stage one dimensional transform to the rows of pixel data within a video block, and then applying a second stage one dimensional transform to the columns of pixel data within the video block, or vice versa. For example, a two dimensional 16×16 transform may be represented by two sets of cascaded butterfly structures similar to cascaded butterfly structures 36. The techniques of this disclosure may include selecting a constant value based on a size of one stage of the two dimensional fixed-point transform, doubling the constant value, and applying a variable localized bit-depth increase at the two dimensional transform with a value less than or equal to the doubled constant value. A variable localized bit-depth with a value less than the doubled constant value may be applied when the lower constant value is large enough to mitigate the rounding errors and/or the lower constant value is necessary to limit the bit-depth needed to implement the transforms. In other examples, a localized bit-depth increase may be applied at each stage of the two dimensional transform with a value equal to the constant value selected for one stage of the two dimensional transform.

Figure 4:
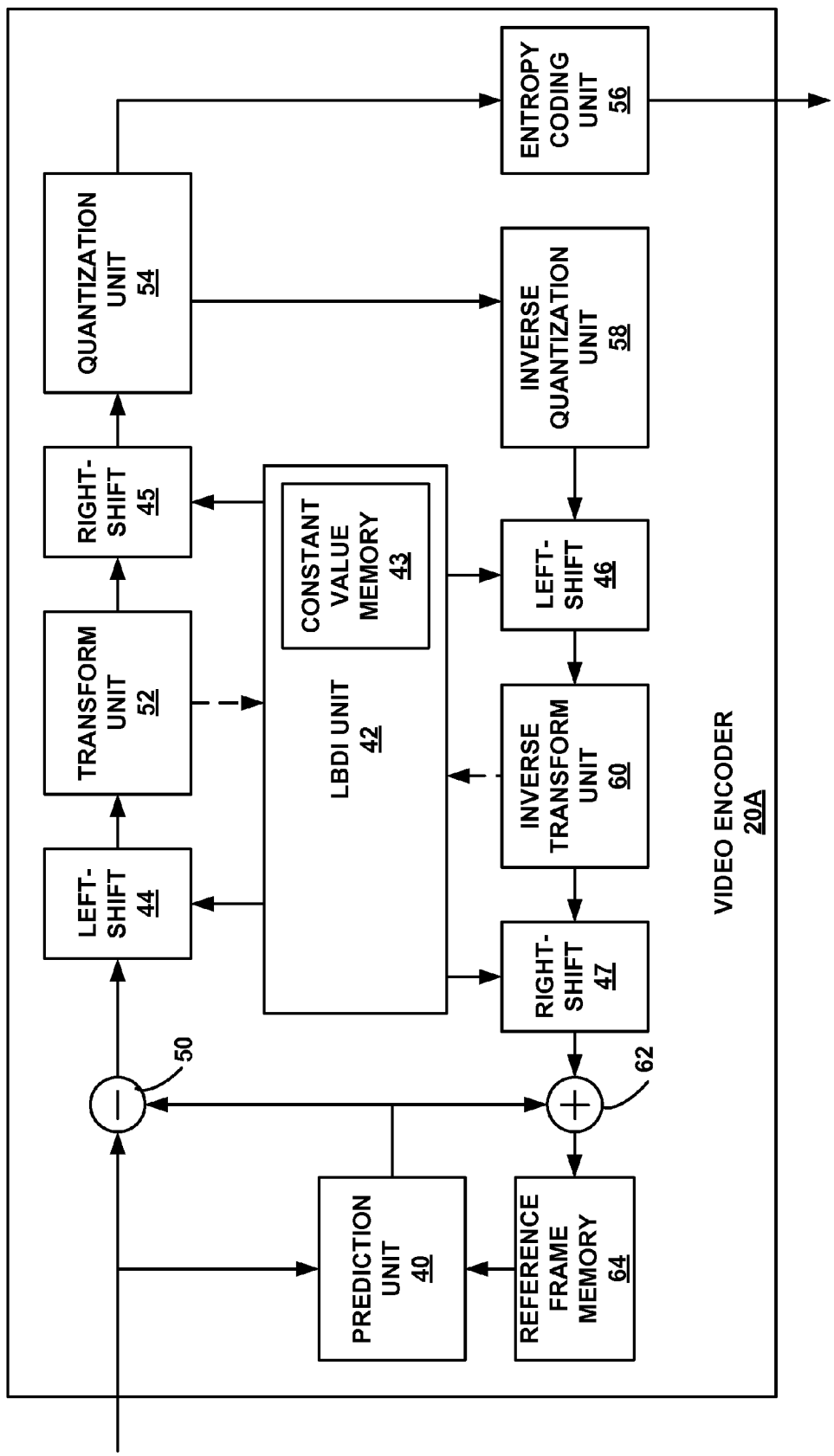
FIG. 4 is a block diagram illustrating an example video encoder that may implement techniques for applying a variable localized bit-depth increase at a transform unit to mitigate rounding errors in a fixed-point implementation of the transform unit.

FIG. 4 is a block diagram illustrating an example video encoder 20A that may implement techniques for applying a variable localized bit-depth increase at a transform unit 52 to mitigate rounding errors in a fixed-point implementation of transform unit 52. Video encoder 20A may comprise one example of video encoder 20 within source device 12 described with reference to FIG. 1.

Video encoder 20A may perform intra- and inter-coding of blocks within video frames of a video signal, including macroblocks, or partitions or sub-partitions of macroblocks. Intra-coding relies on spatial prediction to reduce or remove spatial redundancy in video blocks within a given video frame. Inter-coding relies on temporal prediction to reduce or remove temporal redundancy in video blocks within adjacent frames of a video sequence. Intra-mode (I-mode) may refer to any of several spatial based compression modes and inter-modes such as uni-directional prediction (P-mode), bi-directional prediction (B-mode), or generalized P/B prediction (GPB-mode) may refer to any of several temporal-based compression modes.

Video encoder 20A receives a current video block within a video frame of a video signal to be encoded. In the example of FIG. 4, video encoder 20A includes prediction unit 40, reference frame memory 64, summer 50, transform unit 52, quantization unit 54, and entropy coding unit 56. For video block reconstruction, video encoder 20A also includes inverse quantization unit 58, inverse transform unit 60, and summer 62. A deblocking filter (not shown in FIG. 4) may also be included to filter block boundaries to remove blockiness artifacts from reconstructed video. If desired, the deblocking filter would typically filter the output of summer 62. According to the techniques for applying a variable localized bit-depth increase at transform unit 52 to correct a rounding error of a fixed-point implementation of transform unit 52, video encoder 20A also includes a localized bit-depth increase (LBDI) unit 42 with a constant value memory 43.

During the encoding process, video encoder 20A receives a video frame or slice to be coded. The frame or slice may be divided into multiple video blocks. Prediction unit 40 performs inter-predictive coding of the received video block relative to one or more blocks in one or more reference frames to provide temporal compression. An intra prediction unit may also perform intra-predictive coding of the received video block relative to one or more neighboring blocks in the same frame or slice as the block to be coded to provide spatial compression. Prediction unit 40 may perform mode selection to select one of the coding modes, intra or inter, e.g., based on error results, and provides the resulting intra- or inter-coded block to summer 50 to generate residual block data and to summer 62 to reconstruct the encoded block for use as a reference frame.

Prediction unit 40 may perform both motion estimation and motion compensation. In other examples, motion estimation and motion compensation may comprise separate functional units. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. A motion vector may also indicate displacement of a partition of a macroblock. Motion compensation may involve fetching or generating the predictive block based on the motion vector determined by motion estimation.

When performing motion estimation, prediction unit 40 calculates a motion vector for the video block of an inter-coded frame by comparing the video block to video blocks of a reference frame in reference frame memory 64. Prediction unit 40 sends the calculated motion vector to entropy coding unit 56. The reference frame block identified by a motion vector may be referred to as a predictive block. Prediction unit 40 calculates error values for the predictive block of the reference frame. Prediction unit 40 may also calculate prediction data based on the predictive block. Video encoder 20A forms a residual video block by subtracting the prediction data from prediction unit 40 from the original video block being coded. Summer 50 represents the component or components that perform this subtraction operation.

Transform unit 52 applies a transform, such as a discrete cosine transform (DCT), an integer transform, a wavelet transform, or a conceptually similar linear transform, to the residual video block, producing a video block comprising residual transform coefficient values. Transform unit 52 applies the transform to the residual block, producing a block of residual transform coefficients. Transform unit 52 may convert the residual information from a pixel value domain to a transform domain, such as a frequency domain.

As described above, a fixed-point implementation of transform unit 52 may introduce rounding errors or loss of bit-depth in its transform output signal due to right-shifts by a number of cascaded butterfly structures corresponding to the size of the fixed-point transform of transform unit 52. In order to reduce or eliminate the rounding errors in the fixed-point implementation of transform unit 52, LBDI unit 42 selects a constant value based on a size of the fixed-point transform of transform unit 52 from constant value memory 43, and applies the variable localized bit-depth increase at transform unit 52 with a value equal to the constant value. More specifically, LBDI unit 42 introduces a left-shift 44 to the residual video block data input to transform unit 52 by a number of bits equal to the constant value. LBDI unit 42 also applies a right-shift 45 to the residual transform coefficients output from transform unit 52 by a number of bits equal to the constant value. LBDI unit 42 may also apply an offset to the residual transform coefficients before applying right-shift 45 to the offset residual transform coefficients. In some cases, additional offsets and right-shifts may be applied to the transform output signal, and may be combined with the offset and right-shift of the variable localized bit-depth increase.

Increasing bit-depth of the residual video blocks increases bit precision, but also increases the computational complexity for processing the high bit precision video blocks. LBDI unit 42, therefore, applies left-shift 44 and right-shift 45 directly before and after transform unit 52 to keep the variable localized bit-depth increase localized at transform unit 52. In this way, high complexity processing may be required at transform unit 52, but not at the remaining functional units in video encoder 20A.

Constant value memory 43 within LBDI unit 42 stores a plurality of constant values for a plurality of different transform sizes supported by the video coding standard used by video encoder 20A. Each of the constant values stored in constant value memory 43 is pre-calculated for one of the plurality of different transform sizes. In this way, LBDI unit 42 may select a different constant value for each different transform size applied by transform unit 52 in order to effectively reduce the rounding errors in fixed-point transforms of any size. For example, the H.264 (AVC) standard may support transforms of sizes 4×4 and 8×8. The emerging HEVC standard may support square and/or rectangular transforms of sizes up to 16×16, 32×32, 64×64 or 128×128.

Each of the constant values for one of the plurality of different transform sizes stored in constant value memory 43 are pre-calculated based on an input bit-depth value, $B_i$, of the video signal, a transform bit-depth value, $B_{TR}$, which is the additional number of bits necessary to avoid overflow in the fixed-point transform, and a transform bit-precision value, Z, associated with the fixed-point transform. Each of the constant values, N, may be pre-calculated to satisfy the equation $B_i+B_{TR}+N \leq Z$.

In some cases, a constant value may be pre-calculated to have a large value such that applying a variable localized bit-depth increase with a value equal to the constant value would result in a transform input signal having a bit-depth greater than the overall bit-depth supported by video encoder 20A. For example, if video encoder 20A comprises a 32-bit encoder, a constant value may be pre-calculated that would result in a transform input signal having a bit-depth greater than 32 bits. In that case, the constant value may be reduced before being stored in constant value memory 43 to ensure that the bit-depth of the transform input signal does not exceed the overall bit-depth for video encoder 20A.

In order to pre-calculate each of the constant values for one of the plurality of different transform sizes, the transform bit-precision value, Z, is selected based on the implementation of the fixed-point transform in both a video encoder and/or a video decoder. For example, the transform bit-precision value may be equal to 16, 32, or 64 bits. The transform bit-precision value may depend on the size of the fixed-point transform, and the size of the registers associated with the transform, implemented within the video coding devices.

Moreover, to pre-calculate each of the constant values for one of the plurality of different transform sizes, the transform bit-depth value, $B_{TR}$, necessary to avoid overflow in the fixed-point transform is determined based on the size of the fixed-point transform. More specifically, the transform bit-depth value may be determined based on a worst case analysis of the transform output values at each of the cascaded butterfly structures that represent the fixed-point transform unit. The range of possible values for the transform outputs, $Y_i$ and $Y_{i+1}$, may be calculated based on the multiplication factors, $W_i$ and $W_{i+1}$, at each of the individual butterfly structures. The cumulative bit range for the transform output signal of the entire fixed-point transform provides the maximum number of additional bits, i.e., the transform bit-depth value, $B_{TR}$, needed to avoid overflow in the fixed-point transform.

In some examples, transform unit 52 may comprise a two dimensional fixed-point transform. For example, transform unit 52 may perform a two dimensional transform by applying a first stage one dimensional transform to the rows of pixel data within the residual video blocks, and then applying a second stage one dimensional transform to the columns of pixel data within the residual video blocks, or vice versa. As one example, transform unit 52 may comprise a 16×16 fixed-point transform. LBDI unit 42 may select a constant value based on the size 16×16 for the fixed-point transform of transform unit 52 from the plurality of constant values stored in constant value memory 43. The constant value stored for the size 16×16 may, for example, equal 12 bits. As an example, the stored constant value may be based on a pre-calculation for the size 16×16 transform in which the input bit-depth value, $B_i$, of the video signal is equal to 8 bits, the transform bit-precision value, Z, is equal to 32 bits, and the transform bit-depth value, $B_{TR}$, is equal to 12 bits. The constant value, N, is pre-calculated as equal to 12 bits to satisfy the equation $B_i + B_{TR} + N \leq Z$.

In this example, LBDI unit 42 applies a 12 bit left-shift 44 to the residual video blocks input to transform unit 52. LBDI unit 42 similarly applies a 12 bit right-shift 45 to the residual transform coefficients output from transform unit 52. LBDI 42 may first apply an offset to the residual transform coefficients output from transform unit 52 before applying right-shift 45 to the offset residual transform coefficients. In one example, LBDI 42 may apply an offset equal to $2^{N-1}$, where N is the constant value. In other examples, different offsets may be applied to the residual transform coefficients output from transform unit 52 before applying right-shift 45. In some cases, additional offsets and right-shifts may be applied to the transform output signal along with the variable localized bit-depth increase. In those cases, the offsets and right-shifts may be combined together. For example, if an additional offset has a value of $2^{M-1}$ and an additional right-shift has a value of M, then the combined offset may have a value equal to $2^{M+N-1}$ and the combined right-shift may have a value equal to (M+N).

In some cases, constant value memory 43 may store constant values corresponding to one dimensional transform sizes. When transform unit 52 comprises a two dimensional fixed-point transform, LBDI unit 42 may select a constant value based on a size of one stage of the two dimensional fixed-point transform of transform unit 52 and double the constant value to take both stages of the two dimensional fixed-point transform into account. LBDI unit 42 may then apply a variable localized bit-depth increase at transform unit 52 with a value less than or equal to the doubled constant value. A variable localized bit-depth with a value less than the doubled constant value may be applied when the lower constant value is large enough to mitigate the rounding errors and/or the lower constant value is necessary to limit the bit-depth needed to implement the transforms. In other examples, LBDI unit 42 may apply a localized bit-depth increase at each stage of the two dimensional fixed-point transform of transform unit 52 with a value equal to the constant value selected for one stage of the two dimensional fixed-point transform.

LBDI unit 42 may reduce or eliminate the rounding errors in transform unit 52 by applying the variable localized bit-depth increase at transform unit 52 to provide a higher bit-depth transform input signal for transformation. The higher bit-depth of the residual video block data input to transform unit 52 mitigates the effects of right-shifting performed by cascaded butterfly structures used to represent the fixed-point transform of transform unit 52. Moreover, applying the variable localized bit-depth increase with a value calculated based on the size of the fixed-point transform of transform unit 52 more effectively reduces the rounding errors in transform unit 52 due to the specific fixed-point transform applied to the residual video block data.

Quantization unit 54 quantizes the residual transform coefficients to further reduce the bit rate. The quantization process may reduce the bit depth associated with some or all of the coefficients. The degree of quantization may be modified by adjusting a quantization parameter. In particular, quantization unit 54 may apply a zig-zag scan or other scan pattern to scan the transform coefficients in a macroblock or partition. Following quantization, entropy coding unit 56 entropy codes the quantized transform coefficients. For example, entropy coding unit 56 may perform content adaptive variable length coding (CAVLC), context adaptive binary arithmetic coding (CABAC), or another entropy coding technique. Following the entropy coding by entropy coding unit 56, the encoded video may be transmitted to another device or archived for later transmission or retrieval. In the case of context adaptive binary arithmetic coding, context may be based on neighboring macroblocks.

In some cases, entropy coding unit 56 or another unit of video encoder 20A may be configured to perform other coding functions, in addition to entropy coding. For example, entropy coding unit 56 may be configured to determine the CBP values for the macroblocks and partitions. Also, in some cases, entropy coding unit 56 may perform run length coding of the coefficients in a macroblock or partition thereof. Entropy coding unit 56 also may construct header information with appropriate syntax elements for transmission in the encoded video bitstream.

Inverse quantization unit 58 and inverse transform unit 60 apply inverse quantization and inverse transformation, respectively, to reconstruct the residual block in the pixel domain, e.g., for later use as a reference block. Similar to the processing described above with reference to transform unit 52, LBDI unit 42 selects a constant value based on a size of the fixed-point inverse transform of inverse transform unit 60 from constant value memory 43, and applies the variable localized bit-depth increase at inverse transform unit 60 with a value equal to the constant value.

In some examples, LBDI unit 42 may select a different constant value for the variable localized bit-depth increase at inverse transform unit 60 than at transform unit 52. In some cases, the fixed-point inverse transform applied by inverse transform unit 60 has a different size than the fixed-point forward transform applied by transform unit 52. In other cases, the decoder portion of video encoder 20A may have a lower bit precision value than the encoder portion of video encoder 20A, or inverse quantization unit 58 may produce a left-shift such that the rounding errors in inverse transform unit 60 are less severe than in transform unit 52. Constant value memory 43, therefore, may store different sets of constant values for coding devices with different bit precision values and different de-quantization matrices. It is important, however, that LBDI unit 42 selects a constant value for the variable localized bit-depth increase at inverse transform unit 60 that is the same as a variable localized bit-depth increase at an inverse transform in a corresponding video decoder in order to avoid drift.

LBDI unit 42 introduces a left-shift 46 to the residual transform coefficients input to inverse transform unit 60 by a number of bits equal to the constant value, and applies a right-shift 47 to the residual video block data output from inverse transform unit 60 by a number of bits equal to the constant value. LBDI 42 may also apply an offset to the residual video block data output from inverse transform unit 60 before applying right-shift 47 to the offset residual video block data. In some cases, additional offsets and right-shifts may be applied to the transform output signal, and may be combined with the offset and right-shift of the variable localized bit-depth increase. Again, LBDI unit 42 may apply left-shift 46 and right-shift 47 directly before and after inverse transform unit 60 to keep the variable localized bit-depth increase localized at inverse transform unit 60.

Prediction unit 40 may calculate a reference block by adding the residual block to a predictive block of one of the frames of reference frame memory 64. Prediction unit 40 may also apply one or more interpolation filters to the reconstructed residual block to calculate sub-integer pixel values for use in motion estimation. Summer 62 adds the reconstructed residual block to the motion compensated prediction block produced by prediction unit 40 to produce a reconstructed video block for storage in reference frame memory 64. The reconstructed video block may be used by prediction unit 40 as a reference block to inter-code a block in a subsequent video frame.

Figure 5:
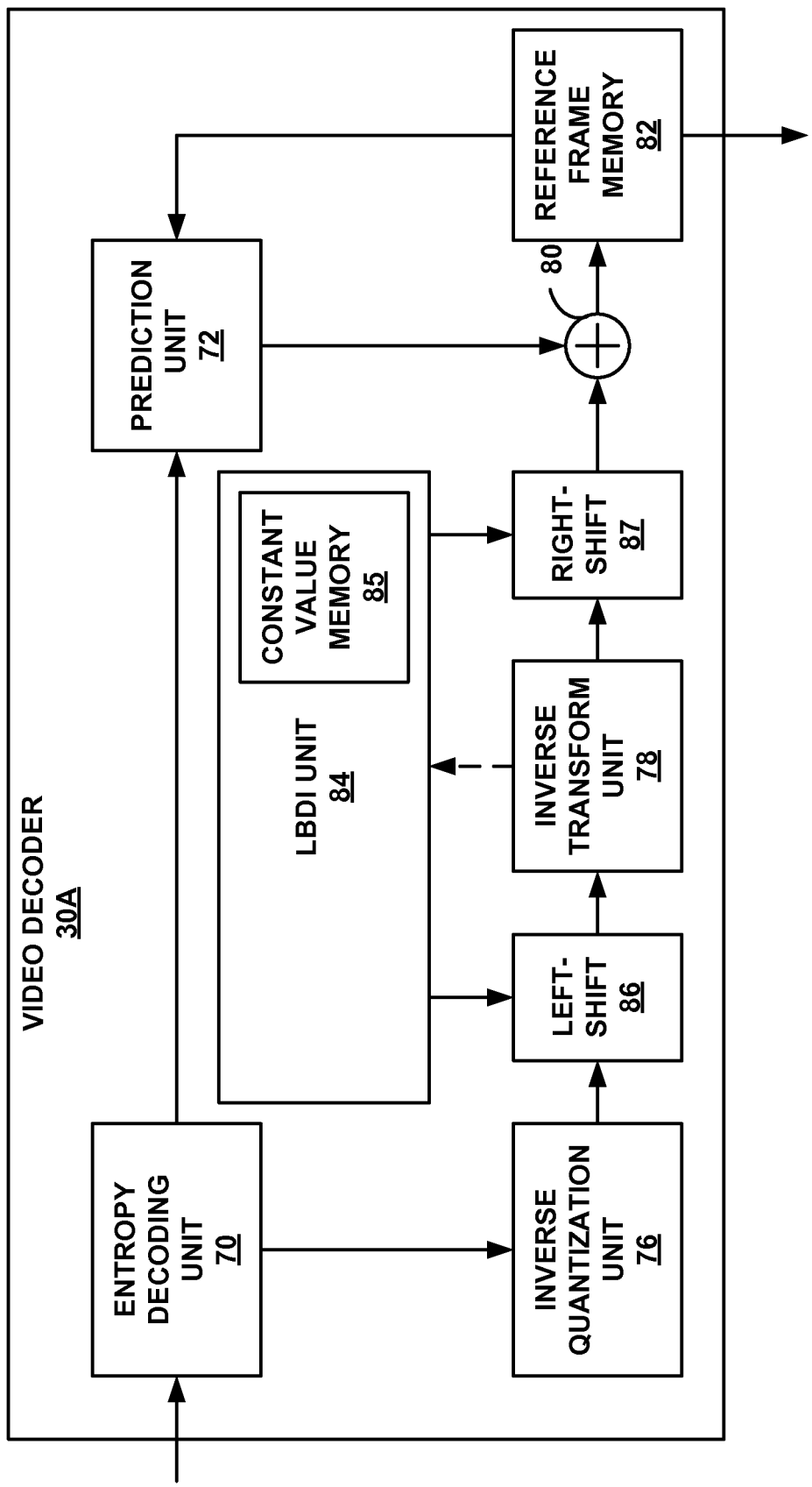
FIG. 5 is a block diagram illustrating an example video decoder that may implement techniques for applying a variable localized bit-depth increase at an inverse transform unit to mitigate rounding errors in a fixed-point implementation of the inverse transform unit.

FIG. 5 is a block diagram illustrating an example of a video decoder 30A that may implement techniques for applying a variable localized bit-depth increase at an inverse transform unit 78 to mitigate rounding errors in a fixed-point implementation of inverse transform unit 78. Video decoder 30A may comprise one example of video decoder 30 within destination device 14 described with reference to FIG. 1.

Video decoder 30A decodes an encoded video sequence received in a bitstream from a video encoder, such as video encoder 20A from FIG. 4. In the example of FIG. 5, video decoder 30A includes an entropy decoding unit 70, prediction unit 72, inverse quantization unit 76, inverse transformation unit 78, reference frame memory 82 and summer 80. According to the techniques for applying a variable localized bit-depth increase at inverse transform unit 78 to mitigate rounding errors in a fixed-point implementation of inverse transform unit 78, video decoder 30A also includes a localized bit-depth increase (LBDI) unit 84 with a constant value memory 85.

Video decoder 30A may, in some examples, perform a decoding pass generally reciprocal to the encoding pass described with respect to video encoder 20A (FIG. 4). Prediction unit 72 may generate prediction data based on motion vectors received from entropy decoding unit 70. Prediction unit 72 may use motion vectors received in the bitstream to identify a prediction block in reference frames in reference frame memory 82. Prediction unit 72 may also use intra prediction modes received in the bitstream to form a prediction block from spatially adjacent blocks. Inverse quantization unit 76 inverse quantizes, i.e., de-quantizes, the quantized block coefficients provided in the bitstream and decoded by entropy decoding unit 70. The inverse quantization process may include a conventional process, e.g., as defined by the H.264 decoding standard. The inverse quantization process may also include use of a quantization parameter calculated by encoder 20A for each macroblock to determine a degree of quantization and, likewise, a degree of inverse quantization that should be applied.

Inverse transform unit 78 applies an inverse transform, e.g., an inverse DCT, an inverse integer transform, an inverse wavelet transform, or a conceptually similar inverse linear transform, to the transform coefficients in order to produce residual video blocks. Inverse transform unit 78 may convert the transform coefficients from a transform domain, such as a frequency domain, to a pixel domain.

As described above in relation to transform unit 52 from FIG. 4, a fixed-point implementation of inverse transform unit 78 may introduce rounding errors or loss of bit-depth in its transform output signal that is dependent on the size of fixed-point inverse transform of inverse transform unit 78. In order to reduce or eliminate the rounding error of the fixed-point implementation of inverse transform unit 78, LBDI unit 84 performs techniques substantially similar to LBDI unit 42 from FIG. 4 to select a constant value based on a size of the fixed-point inverse transform of inverse transform unit 78 from constant value memory 85, and apply the variable localized bit-depth increase at inverse transform unit 78 with a value equal to the constant value.

More specifically, LBDI unit 84 introduces a left-shift 86 to the transform coefficients input to inverse transform unit 78 by a number of bits equal to the constant value. LBDI unit 84 also applies a right-shift 87 to the residual video blocks output from inverse transform unit 78 by a number of bits equal to the constant value. LBDI unit 84 may also apply an offset to the residual video blocks output from inverse transform unit 78 before applying right-shift 87 to the offset residual video blocks. In some cases, additional offsets and right-shifts may be applied to the transform output signal, and may be combined with the offset and right-shift of the variable localized bit-depth increase. LBDI unit 84 applies left-shift 86 and right-shift 87 directly before and after inverse transform unit 78 to keep the variable localized bit-depth increase localized at inverse transform unit 78.

Constant value memory 85 within LBDI unit 84 stores a plurality of constant values for a plurality of different inverse transform sizes support by the video coding standard used by video decoder 30A. Each of the constant values stored in constant value memory 85 is pre-calculated for one of the plurality of different inverse transform sizes. In this way, LBDI unit 84 selects a different constant value for each different inverse transform size applied by inverse transform unit 78 in order to effectively reduce the rounding errors in fixed-point inverse transforms of any size.

Each of the constant values for one of the plurality of different inverse transform sizes stored in constant value memory 85 are pre-calculated based on an input bit-depth value, $B_i$, of the video signal, a transform bit-depth value, $B_{TR}$, which is the additional number of bits necessary to avoid overflow in the fixed-point inverse transform, and a transform bit-precision value, Z, associated with the fixed-point inverse transform. Each of the constant values, N, may be pre-calculated the constant value to satisfy the equation $B_i + B_{TR} + N \leq Z$.

In some cases, a constant value may be pre-calculated to have a large value such that applying a variable localized bit-depth increase with a value equal to the constant value would result in a transform input signal having a bit-depth greater than the overall bit-depth supported by video decoder 30A. For example, if video decoder 30A comprises a 32-bit decoder, a constant value may be pre-calculated that would result in a transform input signal having a bit-depth greater than 32 bits. In that case, the constant value may be reduced before being stored in constant value memory 85 to ensure that the bit-depth of the transform input signal does not exceed the overall bit-depth for video decoder 30A.

In some cases, video decoder 30A may receive explicitly signaled information from video encoder 20A to select the constant value for the variable localized bit-depth increase at inverse transform unit 78. For example, video decoder 30A may explicitly receive the constant value selected by LBDI unit 42 for the variable localized bit-depth increase applied at inverse transform unit 60 in video encoder 20A. It is important, that LBDI unit 84 selects a constant value for the variable localized bit-depth increase at inverse transform unit 78 that is the same as the variable localized bit-depth increase at inverse transform unit 60 in video encoder 20A in order to avoid drift between the encoder and the decoder.

In some examples, inverse transform unit 78 may comprise a two dimensional fixed-point transform. As one example, inverse transform unit 78 may comprise a 16×16 fixed-point inverse transform. LBDI unit 84 may select a constant value based on the size 16×16 for the fixed-point inverse transform of inverse transform unit 78 from the plurality of constant values stored in constant value memory 85. The constant value stored for the size 16×16 may, for example, equal 12 bits. As an example, the stored constant value may be based on a pre-calculation for the size 16×16 transform in which the input bit-depth value, $B_i$, of the video signal is equal to 8 bits, the transform bit-precision value, Z, is equal to 32 bits, and the transform bit-depth value, $B_{TR}$, is equal to 12 bits. The constant value, N, is pre-calculated as equal to 12 bits to satisfy the equation $B_i+B_{TR}+N \leq Z$.

In this example, LBDI unit 84 applies a 12 bit left-shift 86 to the transform coefficients input to inverse transform unit 78. LBDI unit 84 similarly applies a 12 bit right-shift 87 to the residual video blocks output from inverse transform unit 78. LBDI unit 84 may first apply an offset to the residual video blocks output from inverse transform unit 78 before applying right-shift 87 to the offset residual video blocks. In one example, LBDI unit 84 may apply an offset equal to $2^{N-1}$, where N is the constant value. In other examples, different offsets may be applied to the residual video blocks output from inverse transform unit 78 before applying right-shift 87. In some cases, additional offsets and right-shifts may be applied to the transform output signal along with the variable localized bit-depth increase. In those cases, the offsets and right-shifts may be combined together. For example, if an additional offset has a value of $2^{M-1}$ and an additional right-shift has a value of M, then the combined offset may have a value equal to $2^{M+N-1}$ and the combined right-shift may have a value equal to (M+N).

In some cases, constant value memory 85 may store constant values corresponding to one-dimensional transform sizes. When inverse transform unit 78 comprises a two dimensional fixed-point transform, LBDI unit 84 may select a constant value based on a size of one stage of the two dimensional fixed-point transform of inverse transform unit 78 and double the constant value to take both stages of the two dimensional fixed-point transform into account. LBDI unit 84 may then apply a variable localized bit-depth increase at inverse transform unit 78 with a value less than or equal to the doubled constant value. A variable localized bit-depth with a value less than the doubled constant value may be applied when the lower constant value is large enough to mitigate the rounding errors and/or the lower constant value is necessary to limit the bit-depth needed to implement the transforms. In other examples, LBDI unit 84 may apply a localized bit-depth increase at each stage of the two dimensional fixed-point transform of inverse transform unit 78 with a value equal to the constant value selected for one stage of the two dimensional fixed-point transform.

Prediction unit 72 produces motion compensated blocks, possibly performing interpolation based on interpolation filters. Identifiers for interpolation filters to be used for motion estimation with sub-pixel precision may be included in the syntax elements. Prediction unit 72 may use interpolation filters as used by video encoder 20A during encoding of the video block to calculate interpolated values for sub-integer pixels of a reference block. Prediction unit 72 may determine the interpolation filters used by video encoder 20A according to received syntax information and use the interpolation filters to produce predictive blocks.

Prediction unit 72 may use some of the syntax information to determine sizes of macroblocks used to encode frame(s) of the encoded video sequence, partition information that describes how each macroblock of a frame of the encoded video sequence is partitioned, modes indicating how each partition is encoded, one or more reference frames (or lists) for each inter-encoded macroblock or partition, and other information to decode the encoded video sequence.

Summer 80 sums the residual blocks with the corresponding prediction blocks generated by prediction unit 72 to form decoded blocks. If desired, a deblocking filter may also be applied to filter the decoded blocks in order to remove blockiness artifacts. The decoded video blocks are then stored in reference frame memory 82, which provides reference blocks for subsequent motion compensation and also produces decoded video for presentation on a display device (such as display device 32 of FIG. 1).

Figure 6:
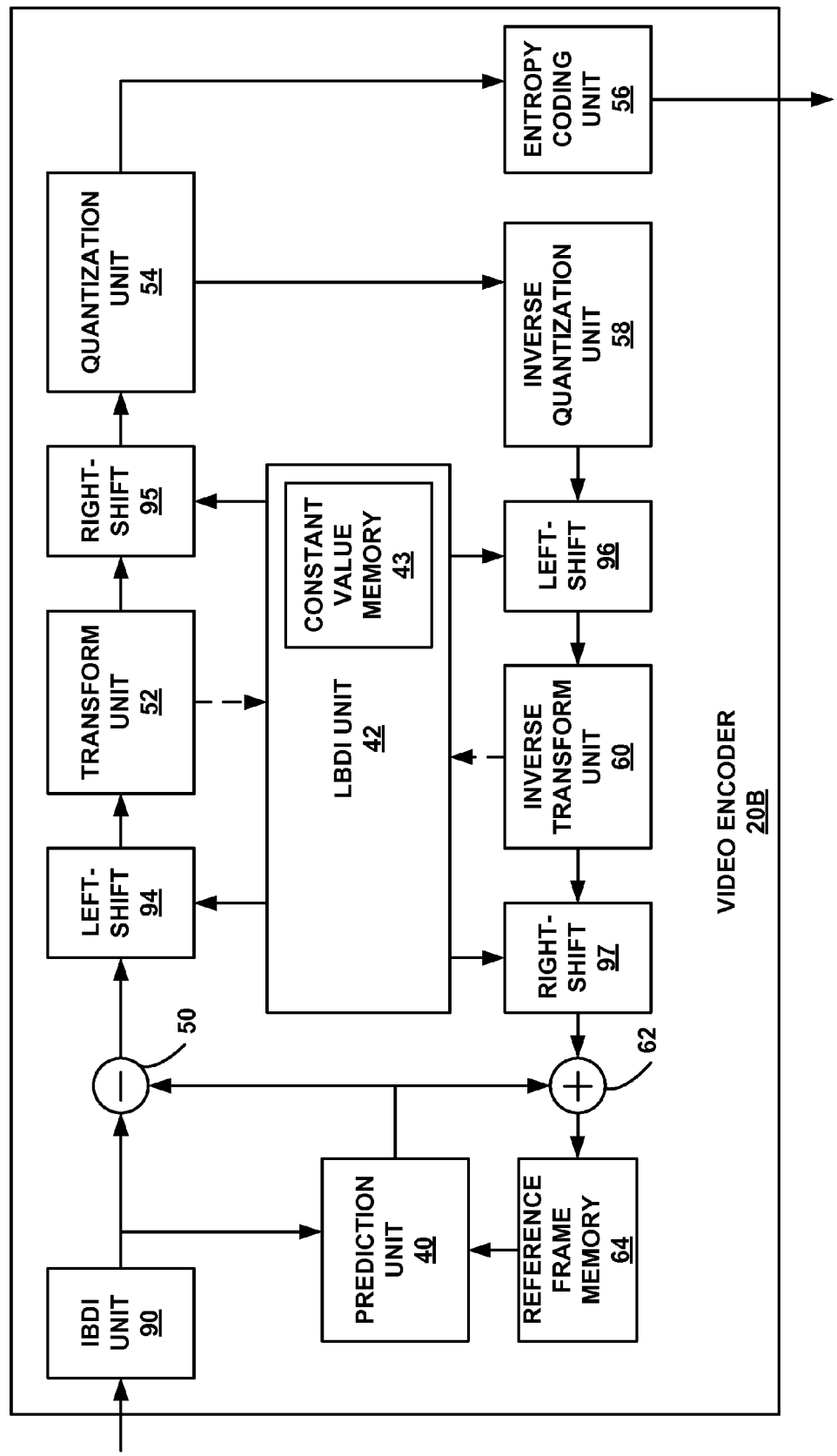
FIG. 6 is a block diagram illustrating an example video encoder in which an internal bit-depth increase (IBDI) is used that may also implement techniques for applying a variable localized bit-depth increase at a transform unit.

FIG. 6 is a block diagram illustrating an example video encoder 20B in which an internal bit-depth increase (IBDI) is used that may also implement techniques for applying a variable localized bit-depth increase at transform unit 52. Video encoder 20B may comprise one example of video encoder 20 within source device 12 described with reference to FIG. 1. Moreover, video encoder 20B may operate substantially similar to video encoder 20A from FIG. 4 with modifications for the IBDI.

Similar to video encoder 20A from FIG. 4, video encoder 20B includes prediction unit 40, reference frame memory 64, summer 50, transform unit 52, quantization unit 54, and entropy coding unit 56. For video block reconstruction, video encoder 20B also includes inverse quantization unit 58, inverse transform unit 60, and summer 62. According to the techniques for applying a variable localized bit-depth increase at transform unit 52 to mitigate rounding errors in a fixed-point implementation of transform unit 52, video encoder 20B also includes LBDI unit 42 with constant value memory 43.

In the illustrated example of FIG. 6, video encoder 20B also includes an internal bit depth increase (IBDI) unit 90 that applies an IBDI to a video signal before video encoder 20B performs any video block coding. In one example, IBDI unit 90 may apply a 4 bit IBDI to the video signal to increase a bit-depth of the video signal from its input bit-depth of 8 bits to 12 bits in order to perform higher bit-precision video coding. When an IBDI is applied to the video signal, high complexity and high bit precision video processing is required at every functional unit within video encoder 20B. Although the application of an IBDI results in a more precise encoding of the video signal, IBDI 90 may only apply an IBDI in an encoder capable of processing and buffering a high bit-depth signal. Moreover, when IBDI 90 applies an IBDI to the video signal, video encoder 20B may explicitly signal a value of the IBDI to an associated video decoder, such as video decoder 30B in FIG. 7, such that the video decoder may remove the IBDI to bring the decoded video signal back to its input bit-depth.

In order to reduce or eliminate rounding errors in the fixed-point implementation of transform unit 52, LBDI unit 42 selects a constant value based on a size of the fixed-point transform of transform unit 52 from constant value memory 43, and adjusts the constant value based on a value of the IBDI applied by IBDI unit 90. LBDI unit 42 then applies the variable localized bit-depth increase at transform unit 52 with a value equal to the adjusted constant value. More specifically, LBDI unit 42 introduces a left-shift 94 to the residual video block data input to transform unit 52 by a number of bits equal to the adjusted constant value. LBDI unit 42 also applies a right-shift 95 to the residual transform coefficients output from transform unit 52 by a number of bits equal to the adjusted constant value. LBDI unit 42 may also apply an offset to the residual transform coefficients output from transform unit 52 before applying right-shift 95 to the offset residual transform coefficient. In some cases, additional offsets and right-shifts may be applied to the transform output signal, and combined with the offset and right-shift of the variable localized bit-depth increase.

As described above with respect to FIG. 4, constant value memory 43 within LBDI unit 42 stores a plurality of constant values for a plurality of different transform sizes supported by the video coding standard used by video encoder 20B. Each of the constant values stored in constant value memory 43 is pre-calculated for one of the plurality of different transform sizes. When an IBDI is applied to the video signal, LBDI unit 42 continues to select the constant value based on the size of the fixed-point transform of transform unit 52 from constant value memory 43. Once the constant value is selected, however, LBDI 42 may reduce the constant value by the value of the IBDI applied by IBDI unit 90.

LBDI unit 42, however, may only reduce the constant value to a non-negative value, and otherwise sets the constant value equal to zero. A negative constant value would result in LBDI unit 42 applying a right shift to the residual video blocks input to transform unit 42 instead of left-shift 94, potentially making the rounding errors in the transform output signal even larger. LBDI unit 42, therefore, reduces the constant value, N, by the value of the IBDI, $B_d$, applied by IBDI unit 90, such that the adjusted constant value is equal to N–$B_d$, as long as the value of the IBDI is less than or equal to the constant value, i.e., (N–$B_d$)≥0. When the value of the IBDI, $B_d$, applied by IBDI unit 90 is greater than the constant value, N, i.e., (N–$B_d$)<0, then LBDI unit 42 reduces the constant value, N, to zero. In this case, LBDI unit 42 applies no variable localized bit-depth increase at transform unit 52.

As an example, IBDI unit 90 may apply a 4 bit IBDI to the video signal input to video encoder 20B, and transform unit 52 may comprise a fixed-point 16×16 transform. LBDI unit 42 may select the constant value, N, as equal to 8 bits for the size 16×16 transform. LBDI unit 42 then reduces the constant value, N, by the value of the IBDI, $B_d$, applied by IBDI unit 90 such that the adjusted constant value is equal to 4 bits. In this example, LBDI unit 42 applies a 4 bit left-shift 94 to the residual video blocks input to transform unit 52, and a 4 bit right-shift 95 to the residual transform coefficients output from transform unit 52. In another example, IBDI unit 90 may apply a 10 bit IBDI to the video signal. In this case, LBDI unit 42 reduces the constant value, N, to zero because reducing the constant value, N, by the value of the IBDI, $B_d$, would result in a negative value. In this example, LBDI unit 42 applies no variable localized bit-depth increase at transform unit 52.

Similar to the processing described above with reference to transform unit 52, LBDI unit 42 selects a constant value based on a size of the fixed-point inverse transform of inverse transform unit 60, and adjusts the constant value based on the value of the IBDI applied by IBDI unit 90. LBDI unit 42 then applies the variable localized bit-depth increase at inverse transform unit 60 with a value equal to the adjusted constant value. In some examples, LBDI unit 42 may select a different constant value for the variable localized bit-depth increase at inverse transform unit 60 than at transform unit 52, resulting in a different adjusted constant value. It is important, however, that LBDI unit 42 selects and adjusts a constant value for the variable localized bit-depth increase at inverse transform unit 60 that is the same as a variable localized bit-depth increase at an inverse transform in a corresponding video decoder in order to avoid drift.

LBDI unit 42 introduces a left-shift 96 to the residual transform coefficients input to inverse transform unit 60 by a number of bits equal to the constant value, and applies a right-shift 97 to the residual video block data output from inverse transform unit 60 by a number of bits equal to the constant value. LBDI unit 42 may also apply an offset to the residual video block data output from inverse transform unit 60 before applying right-shift 97 to the offset residual video block data. In some cases, additional offsets and right-shifts may be applied to the transform output signal, and combined with the offset and right-shift of the variable localized bit-depth increase.

Figure 7:
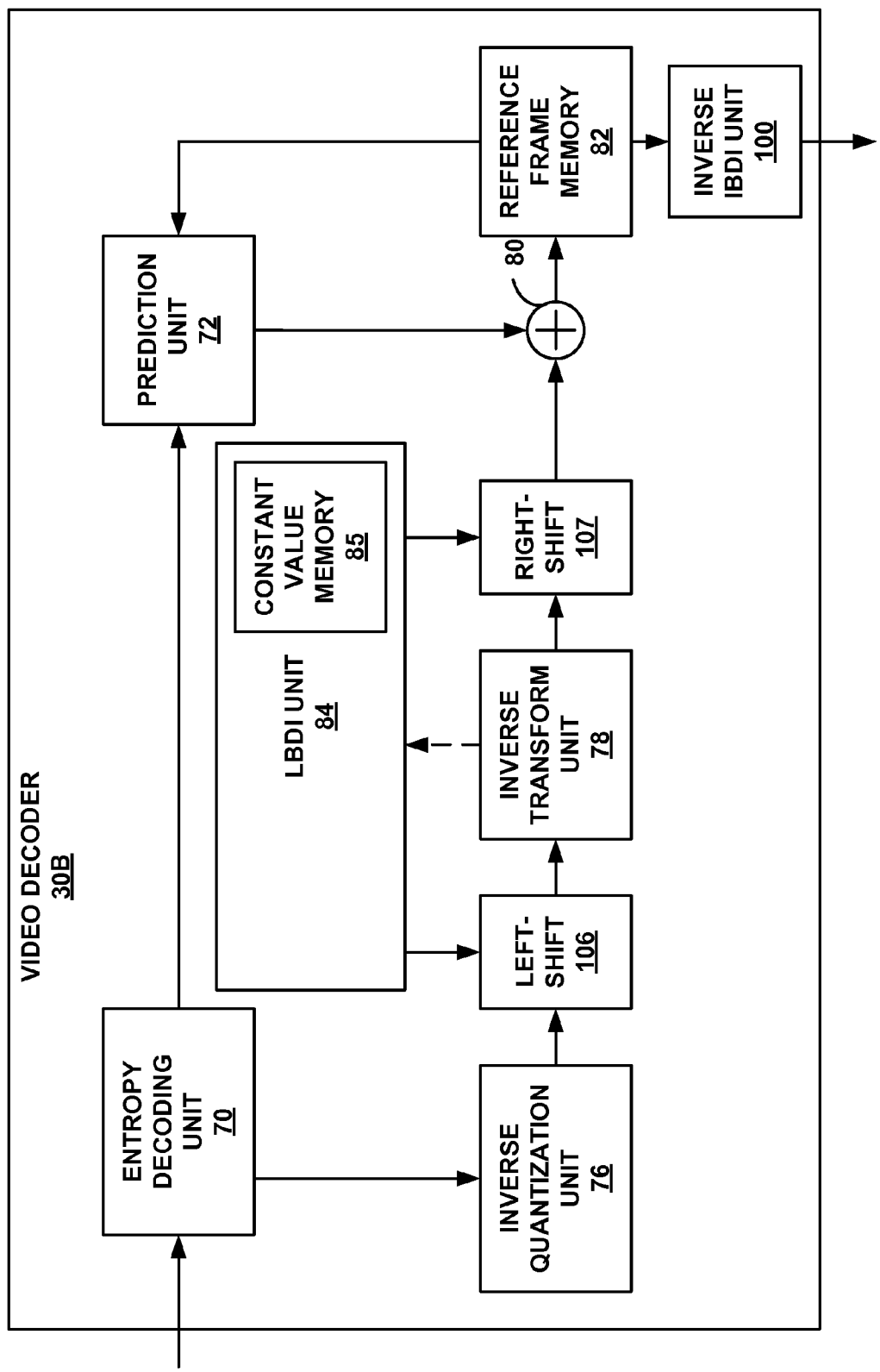
FIG. 7 is a block diagram illustrating an example video decoder in which an internal bit-depth increase (IBDI) is used that may also implement techniques for applying a variable localized bit-depth increase at an inverse transform unit.

FIG. 7 is a block diagram illustrating an example of a video decoder 30B in which an internal bit-depth increase (IBDI) is used that may also implement techniques for applying a variable localized bit-depth increase at an inverse transform unit 78. Video decoder 30B may comprise one example of video decoder 30 within destination device 14 described with reference to FIG. 1. Moreover, video decoder 30B may operate substantially similar to video decoder 30A from FIG. 5 with modifications for the IBDI.

Similar to video decoder 30A from FIG. 5, video decoder 30B includes entropy decoding unit 70, prediction unit 72, inverse quantization unit 76, inverse transformation unit 78, reference frame memory 82 and summer 80. According to the techniques for applying a variable localized bit-depth increase at inverse transform unit 78 to mitigate rounding errors in a fixed-point implementation of inverse transform unit 78, video decoder 30B also includes LBDI unit 84 with constant value memory 85.

Video decoder 30B decodes an encoded video sequence having an internal bit-depth increase (IBDI) received in a bitstream from a video encoder, such as video encoder 20B from FIG. 6. In some cases, video decoder 30B may receive explicitly signaled information from video encoder 20B to select and adjust the constant value for the variable localized bit-depth increase at inverse transform unit 78. For example, video decoder 30B may explicitly receive the constant value selected by LBDI unit 42 and the value of the IBDI used by LBDI unit 42 to adjust the constant value for the variable localized bit-depth increase applied at inverse transform unit 60 in video encoder 20B. It is important, that LBDI unit 84 selects and adjusts a constant value for the variable localized bit-depth increase at inverse transform unit 78 that is the same as the variable localized bit-depth increase at inverse transform unit 60 in video encoder 20A in order to avoid drift between the encoder and the decoder.

In the illustrated example of FIG. 7, video decoder 30B includes an inverse IBDI unit 100 that applies an inverse IBDI to a decoded video signal after video decoder 30B performs video block decoding. Inverse IBDI unit 100 may apply an inverse IBDI to the decoded video signal with a value equal to the explicitly received value of the IBDI applied to the video signal by IBDI unit 90 in video encoder 20B. In this way, video decoder 30B may remove the IBDI to bring the decoded video signal back to its input bit-depth. In one example, inverse IBDI unit 100 may apply a 4 bit inverse IBDI to the decoded video signal to decrease a bit-depth of the decoded video signal from 12 bits to its input bit-depth of 8 bits.

In order to reduce or eliminate rounding errors in the fixed-point implementation of inverse transform unit 78, LBDI unit 82 selects a constant value based on a size of the fixed-point inverse transform of inverse transform unit 78 from constant value memory 85, and adjusts the constant value based on a value of the IBDI applied by IBDI unit 90 in video encoder 20B and explicitly signaled to video decoder 30B. LBDI unit 84 then applies the variable localized bit-depth increase at inverse transform unit 78 with a value equal to the adjusted constant value.

More specifically, LBDI unit 84 introduces a left-shift 106 to the transform coefficients input to inverse transform unit 78 by a number of bits equal to the adjusted constant value. LBDI unit 84 also applies a right-shift 107 to the residual video blocks output from inverse transform unit 78 by a number of bits equal to the adjusted constant value. LBDI unit 84 may also apply an offset to the residual video blocks output from inverse transform unit 78 before applying right-shift 107 to the offset residual video blocks. In some cases, additional offsets and right-shifts may be applied to the transform output signal, and combined with the offset and right-shift of the variable localized bit-depth increase.

As described above with respect to FIG. 5, constant value memory 85 within LBDI unit 84 stores a plurality of constant values for a plurality of different inverse transform sizes supported by the video coding standard used by video decoder 30B. Each of the constant values stored in constant value memory 85 is pre-calculated for one of the plurality of different inverse transform sizes. When an IBDI is applied to the video signal, LBDI unit 84 continues to select the constant value based on the size of the fixed-point inverse transform of inverse transform unit 78 from constant value memory 85. Once the constant value is selected, however, LBDI 84 may reduce the constant value by the value of the IBDI applied by IBDI unit 90 in video encoder 20B and explicitly signaled to video decoder 30B.

LBDI unit 84, however, may only reduce the constant value to a non-negative value, and otherwise sets the constant value equal to zero. A negative constant value would result in LBDI unit 84 applying a right shift to the transform coefficients input to inverse transform unit 78 instead of left-shift 106, potentially making the rounding errors in the transform output signal even larger. LBDI unit 84, therefore, reduces the constant value, N, by the value of the IBDI, $B_d$, such that the adjusted constant value is equal to N−$B_d$, as long as the value of the IBDI is less than or equal to the constant value, i.e., (N−$B_d$)≥0. When the value of the IBDI, $B_d$, is greater than the constant value, N, i.e., (N−$B_d$)<0, then LBDI unit 84 reduces the constant value, N, to zero. In this case, LBDI unit 84 applies no variable localized bit-depth increase at inverse transform unit 78.

As an example, IBDI unit 90 may have applied a 4 bit IBDI to the video signal in video encoder 20B, and inverse transform unit 78 may comprise a fixed-point 16×16 transform. LBDI unit 84 may select the constant value, N, as equal to 8 bits for the size 16×16 transform. LBDI unit 84 then reduces the constant value, N, by the value of the IBDI, $B_d$, such that the adjusted constant value is equal to 4 bits. In this example, LBDI unit 84 applies a 4 bit left-shift 106 to the transform coefficients input to inverse transform unit 78, and a 4 bit right-shift 95 to the residual video blocks output from inverse transform unit 78. In another example, IBDI unit 90 may have applied a 10 bit IBDI to the video signal in video encoder 20B. In this case, LBDI unit 84 reduces the constant value, N, to zero because reducing the constant value, N, by the value of the IBDI, $B_d$, would result in a negative value. In this example, LBDI unit 84 applies no variable localized bit-depth increase at inverse transform unit 78.

Figure 8:
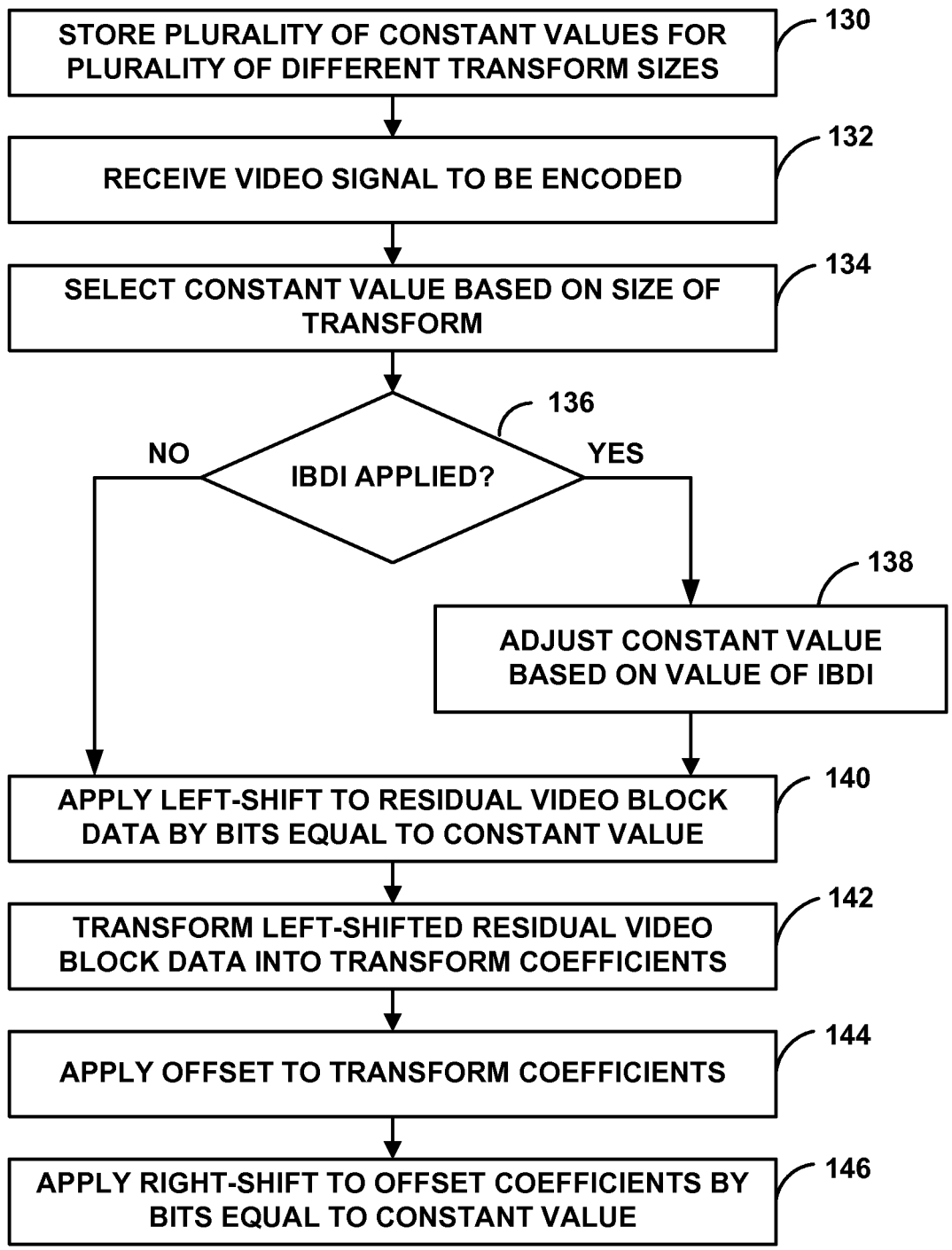
FIG. 8 is a flowchart illustrating an exemplary method of applying a variable localized bit-depth increase at a transform unit to mitigate rounding errors in a fixed-point implementation of the transform unit.

FIG. 8 is a flowchart illustrating an exemplary method of applying a variable localized bit-depth increase at a transform unit to mitigate rounding errors of a fixed-point implementation of the transform unit. The method illustrated in FIG. 8 will be described with respect to video encoder 20A from FIG. 4 and video encoder 20B from FIG. 6.

Video encoder 20A or 20B stores a plurality of constant values for a plurality of different transform sizes in constant value memory 43 in LBDI unit 42 (130). As described above, each of the constant values associated with one of the plurality of different transform sizes is pre-calculated based on an input bit-depth value of the video signal, $B_i$, a transform bit-depth value associated with the transform size, $B_{TR}$, and a transform bit-precision value associated with the transform size, Z. For example, each constant value, N, may be pre-calculated to satisfy the equation $B_i + B_{TR} + N \leq Z$.

Video encoder 20A or 20B then receives a video signal to be encoded (132). Upon receiving the video signal, LBDI unit 42 of video encoder 20A or 20B determines a size of the fixed-point transform to be applied by transform unit 52, and selects a constant value stored in constant value memory 53 based on the size of the fixed-point transform (134).

LBDI unit 42 then determines whether an internal bit-depth increase (IBDI) has been applied to the received video signal (136). If an IBDI has not been applied (NO of 136), as in the example of video encoder 20A from FIG. 4, directly before transform unit 52, LBDI unit 42 applies left-shift 44 to residual video block data input to transform unit 52 by a number of bits equal to the selected constant value (140). Transform unit 52 then transforms the left-shifted residual video block data into transform coefficients (142). Directly after transform unit 52, LBDI unit 42 may apply an offset to the transform coefficients output from transform unit 52 (144). For example, LBDI unit 42 may apply an offset equal to $2^{N-1}$ to the transform coefficients. LBDI unit 42 then applies right-shift 45 to the offset transform coefficients by a number of bits equal to the selected constant value (146).

In some cases, additional offsets and right-shifts may be applied to the transform output signal along with the variable localized bit-depth increase. In those cases, the offsets and right-shifts may be combined together. For example, if an additional offset has a value of $2^{M-1}$ and an additional right-shift has a value of M, then the combined offset may have a value equal to $2^{M+N-1}$ and the combined right-shift may have a value equal to (M+N).

If an IBDI has been applied (YES of 136), as in the example of video encoder 20B from FIG. 6, LBDI unit 42 determines a value of the IBDI applied to the video signal by IBDI unit 90. LBDI unit 42 then adjusts the selected constant value based on the value of the IBDI (138). In this case, the constant value, N, selected for the size of the fixed-point transform of transform unit 52 will be reduced by the value of the IBDI, $B_d$, such that the adjusted constant value is equal to N−$B_d$.

LBDI unit 42 may only reduce the selected constant value to a non-negative value. For example, LBDI unit 42 reduces the selected constant value by the value of the IBDI when the value of the IBDI is less than or equal to the selected constant value, such that (N−$B_d$)≥0. If the value of the IBDI is greater than the selected constant value, such that (N−Bd)<0, then LBDI unit 42 reduces the selected constant value to zero.

Directly before transform unit 52, LBDI unit 42 applies left-shift 94 to residual video block data input to transform unit 52 by a number of bits equal to the adjusted constant value (140). Transform unit 52 then transforms the left-shifted residual video block data into transform coefficients (142). Directly after transform unit 52, LBDI unit 42 may apply an offset to the transform coefficients output from transform unit 52 (144). For example, LBDI unit 42 may apply an offset equal to $2^{N-1}$ to the transform coefficients. LBDI unit 42 then applies right-shift 95 to the offset transform coefficients by a number of bits equal to the adjusted constant value (146).

In some cases, additional offsets and right-shifts may be applied to the transform output signal along with the variable localized bit-depth increase. In those cases, the offsets and right-shifts may be combined together. For example, if an additional offset has a value of $2^{M-1}$ and an additional right-shift has a value of M, then the combined offset may have a value equal to $2^{M+N-1}$ and the combined right-shift may have a value equal to (M+N).

LBDI unit 42 may reduce or eliminate the rounding error of transform unit 52 by applying the variable localized bit-depth increase at transform unit 52 to provide a higher bit-depth transform input signal for transformation. The higher bit-depth of the residual video block data input to transform unit 52 are less corrupted by the amount of right-shifting performed by cascaded butterfly structures used to represent the fixed-point transform of transform unit 52. Moreover, applying the variable localized bit-depth increase with a value calculated based on the size of the fixed-point transform of transform unit 52 more effectively reduces the rounding error of transform unit 52 due to the specific fixed-point transform applied to the residual video block data.

Figure 9:
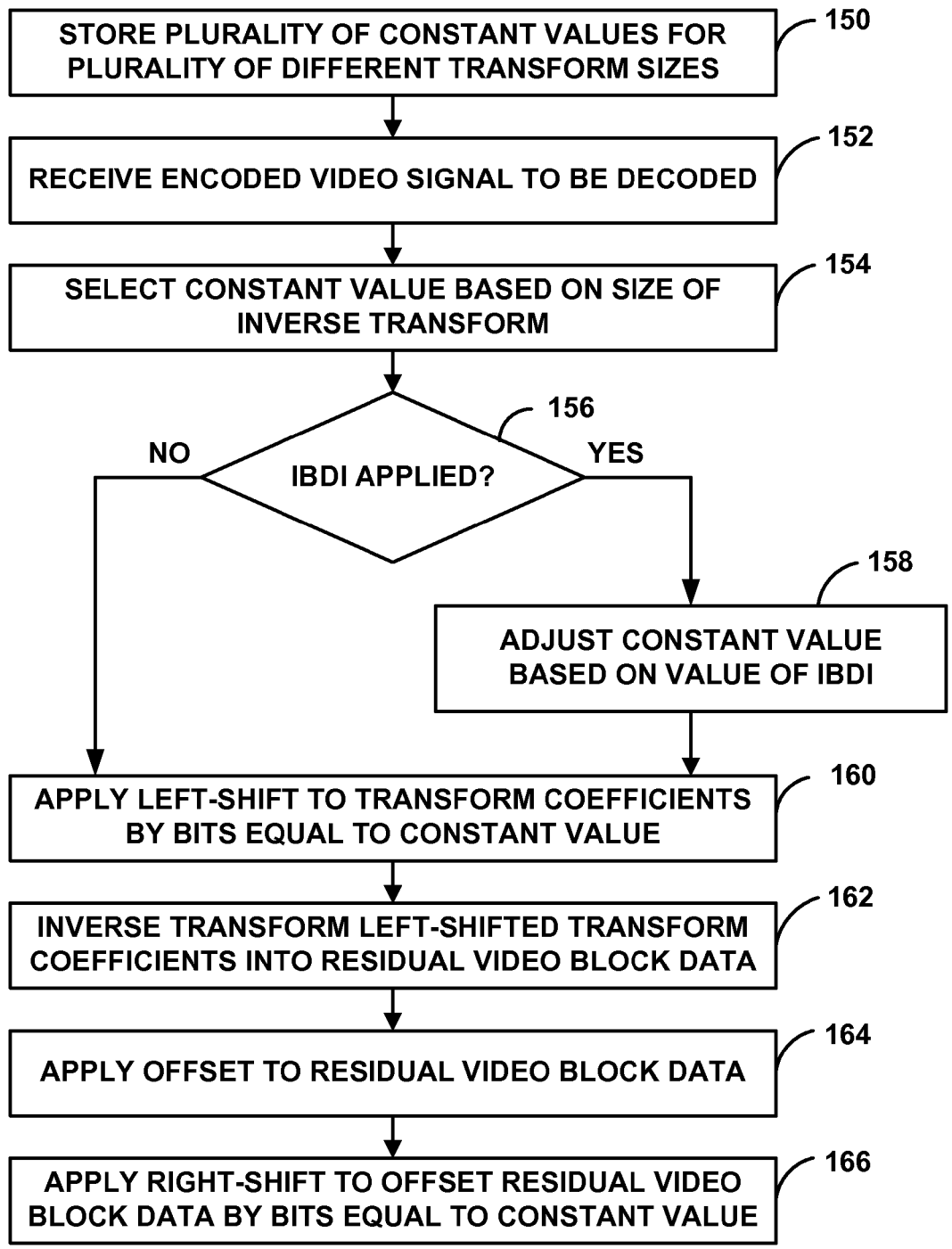
FIG. 9 is a flowchart illustrating an exemplary method of applying a variable localized bit-depth increase at an inverse transform unit to mitigate rounding errors in a fixed-point implementation of the inverse transform unit.

FIG. 9 is a flowchart illustrating an exemplary method of applying a variable localized bit-depth increase at an inverse transform unit to mitigate rounding errors of a fixed-point implementation of the inverse transform unit. The method illustrated in FIG. 9 will be described with respect to video decoder 30A from FIG. 5 and video decoder 30B from FIG. 7.

Video decoder 30A or 30B stores a plurality of constant values for a plurality of different transform sizes in constant value memory 85 in LBDI unit 84 (150). As described above, each of the constant values associated with one of the plurality of different transform sizes is pre-calculated based on an input bit-depth value of the video signal, $B_i$, a transform bit-depth value associated with the transform size, $B_{TR}$, and a transform bit-precision value associated with the transform size, Z. For example, each constant value, N, may be pre-calculated to satisfy the equation $B_i+B_{TR}+N \leq Z$.

Video decoder 30A or 30B then receives an encoded video signal to be decoded (152). Upon receiving the encoded video signal, LBDI unit 84 of video decoder 30A or 30B determines a size of the fixed-point inverse transform to be applied by inverse transform unit 78, and selects a constant value stored in constant value memory 85 based on the size of the fixed-point transform (154).

LBDI unit 84 then determines whether an internal bit-depth increase (IBDI) was applied to the video signal at the video encoder (156). In the case where an IBDI is applied to the video signal, the video encoder may explicitly signal the value of the IBDI to video decoder 30A or 30B. If an IBDI has not been applied (NO of 156), as in the example of video decoder 30A from FIG. 5, directly before inverse transform unit 78, LBDI unit 84 applies left-shift 86 to transform coefficients input to inverse transform unit 78 by a number of bits equal to the selected constant value (160). Inverse transform unit 78 then inverse transforms the left-shifted transform coefficients into residual video block data (162). Directly after inverse transform unit 78, LBDI unit 84 may apply an offset to the residual video block data output from inverse transform unit 78 (164). For example, LBDI unit 84 may apply an offset equal to $2^{N-1}$ to the residual video block data. LBDI unit 84 then applies right-shift 87 to the offset residual video block data by a number of bits equal to the selected constant value (166).

In some cases, additional offsets and right-shifts may be applied to the transform output signal along with the variable localized bit-depth increase. In those cases, the offsets and right-shifts may be combined together. For example, if an additional offset has a value of $2^{M-1}$ and an additional right-shift has a value of M, then the combined offset may have a value equal to $2^{M+N-1}$ and the combined right-shift may have a value equal to (M+N).

If an IBDI has been applied (YES of 156), as in the example of video decoder 30B from FIG. 7, LBDI unit 84 determines the value of the IBDI as explicitly signaled by video encoder 20B. LBDI unit 84 then adjusts the selected constant value based on the value of the IBDI (158). In this case, the constant value, N, selected for the size of the fixed-point transform of transform unit 52 will be reduced by the value of the IBDI, $B_d$, such that the adjusted constant value is equal to $N-B_d$.

LBDI unit 84 may only reduce the selected constant value to a non-negative value. For example, LBDI unit 84 reduces the selected constant value by the value of the IBDI when the value of the IBDI is less than or equal to the selected constant value, such that $(N-B_d) \geq 0$. If the value of the IBDI is greater than the selected constant value, such that (N−Bd)<0, then LBDI unit 84 reduces the selected constant value to zero.

Directly before inverse transform unit 78, LBDI unit 84 applies left-shift 106 to transform coefficients input to inverse transform unit 78 by a number of bits equal to the adjusted constant value (160). Inverse transform unit 78 then inverse transforms the left-shifted transform coefficients into residual video block data (162). Directly after inverse transform unit 78, LBDI unit 84 may apply an offset to the residual video block data output from inverse transform unit 78 (164). For example, LBDI unit 84 may apply an offset equal to $2^{N-1}$ to the residual video block data. LBDI unit 84 then applies right-shift 107 to the offset residual video block data by a number of bits equal to the adjusted constant value (166).

In some cases, additional offsets and right-shifts may be applied to the transform output signal along with the variable localized bit-depth increase. In those cases, the offsets and right-shifts may be combined together. For example, if an additional offset has a value of $2^{M-1}$ and an additional right-shift has a value of M, then the combined offset may have a value equal to $2^{M+N-1}$ and the combined right-shift may have a value equal to (M+N).

LBDI unit 84 may reduce or eliminate the rounding error of inverse transform unit 78 by applying the variable localized bit-depth increase at inverse transform unit 78 to provide a higher bit-depth transform input signal for transformation. The higher bit-depth of the transform coefficients input to inverse transform unit 78 are less corrupted by the amount of right-shifting performed by cascaded butterfly structures used to represent the inverse fixed-point transform of inverse transform unit 78. Moreover, applying the variable localized bit-depth increase with a value calculated based on the size of the fixed-point inverse transform of inverse transform unit 78 more effectively reduces the rounding error of inverse transform unit 78 due to the specific fixed-point inverse transform applied to the transform coefficients.

Table 1 and Table 2 presented below provide initial results of applying the localized bit-depth increase at a linear transform when an internal bit-depth increase (IBDI) is not applied. Table 1 and Table 2 both provide bit-rate reduction percentages for several video sequences without the localized bit-depth increase when an IBDI is applied, and with the localized bit-depth increase when an IBDI is not applied. Table 1 presents the results for a low-delay High Efficiency, i.e., generalized P/B (GPB), configuration and Table 2 presents the results for a random access High Efficiency, i.e., hierarchical-B, configuration. The average bit-rate reduction with the localized bit-depth increase is 1.26% for the low delay High Efficiency configuration (Table 1) and 1.03% for the random access High Efficiency configuration (Table 2).

TABLE 1

Bit-rate reduction [%] due to variable localized bit-depth increase for low-delay High Efficiency configuration

|  |  | IBDI on | IBDI off, localized bit-depth increase |
|---|---|---|---|
| WQVGA | RaceHorses | −1.88 | −0.38 |
|  | Basketball | −2.29 | −0.90 |
|  | PartyScene | −2.18 | −0.11 |
|  | BQSquare | −2.51 | −0.18 |
|  | WQVGA_AVG | −2.22 | −0.39 |
| WVGA | RaceHorses | −2.54 | −0.79 |
|  | Basketball | −4.51 | −1.29 |
|  | PartyScene | −2.14 | −0.40 |
|  | BQSquare | −4.52 | −0.96 |
|  | WVGA_AVG | −3.43 | −0.86 |
| 720 p | Vidyo1 | −11.84 | −1.85 |
|  | Vidyo3 | −12.26 | −1.07 |
|  | Vidyo4 | −12.80 | −2.03 |
|  | 720p_AVG | −12.30 | −1.65 |
| 1080 p | ParkScene | −4.11 | −0.94 |
|  | Kimono | −4.79 | −3.22 |
|  | Basketball | −7.01 | −3.39 |
|  | Cactus | −4.64 | −1.75 |
|  | BQSquare | −5.91 | −0.93 |
|  | 1080p_AVG | −5.29 | −2.05 |
|  | AVG | −5.37 | −1.26 |

TABLE 2

Bit-rate reduction [%] due to variable localized bit-depth increase for random access High Efficiency configuration

|  |  | IBDI on | IBDI off, localized bit-depth increase |
|---|---|---|---|
| WQVGA | RaceHorses | −1.04 | −0.29 |
|  | Basketball | −1.37 | −0.50 |
|  | PartyScene | −1.65 | −0.35 |
|  | BQSquare | −2.28 | −0.39 |
|  | WQVGA_AVG | −1.59 | −0.38 |
| WVGA | RaceHorses | −1.55 | −0.54 |
|  | Basketball | −3.42 | −1.10 |
|  | PartyScene | −1.72 | −0.32 |
|  | BQSquare | −2.60 | −0.55 |
|  | WVGA_AVG | −2.32 | −0.63 |
| 720 p | Vidyo1 | −8.38 | −1.89 |
|  | Vidyo3 | −6.89 | −1.24 |
|  | Vidyo4 | −7.76 | −1.72 |
|  | 720p_AVG | −7.68 | −1.62 |
| 1080 p | ParkScene | −3.00 | −0.68 |
|  | Kimono | −3.82 | −2.49 |
|  | Basketball | −4.78 | −2.54 |
|  | Cactus | −3.22 | −1.07 |
|  | BQSquare | −4.74 | −0.86 |
|  | 1080p_AVG | −3.91 | −1.53 |
|  | AVG | −3.64 | −1.03 |

In one or more examples, the functions or operations described in this disclosure may be implemented in hardware, software, firmware, or any combination thereof. If implemented in software, the functions or operations may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise non-transitory media such as RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of coding a video signal, the method comprising:
storing, in a video coding device, a plurality of pre-calculated constant values, wherein each of the plurality of pre-calculated constant values indicates a variable localized bit-depth increase associated with one of a plurality of different transform sizes associated with video coding, and wherein each of the plurality of pre-calculated constant values is pre-calculated based on an input bit-depth value of the video signal, a transform bit-depth value associated with the one of the plurality of different transform sizes, and a transform bit-precision value associated with the one of the plurality of different transform sizes;
selecting a constant value from the plurality of pre-calculated constant values based on a size of a fixed-point transform in the video coding device; and
applying, at the fixed-point transform in the video coding device, the variable localized bit-depth increase indicated by the selected constant value by left-shifting a transform input signal by a number of bits equal to the constant value before the fixed-point transform, and right-shifting a transform output signal by a number of bits equal to the constant value after the fixed-point transform.

2. The method of claim 1, wherein the fixed-point transform comprises a two dimensional fixed-point transform,
wherein selecting the constant value comprises selecting the constant value based on a size of one stage of the two dimensional fixed-point transform, and doubling the constant value; and
wherein applying a variable localized bit-depth increase comprises applying the variable localized bit-depth increase at the two dimensional fixed-point transform with a value less than or equal to the doubled constant value.

3. The method of claim 1, the method further comprising:
determining whether an internal bit-depth increase is applied to the video signal; and
when the internal bit-depth increase is applied to the video signal, adjusting the constant value based on a value of the internal bit-depth increase, wherein applying a variable localized bit-depth increase comprises applying the variable localized bit-depth increase at the fixed-point transform with a value equal to the adjusted constant value.

4. The method of claim 3, wherein adjusting the constant value comprises reducing the constant value, N, by the value of the internal bit-depth increase, $B_d$, such that the adjusted constant value is equal to $N-B_d$.

5. The method of claim 4, wherein adjusting the constant value comprises reducing the constant value, N, by the value of the internal bit-depth increase, $B_d$, when the value of the internal bit-depth increase is less than or equal to the constant value, such that $(N-B_d) \geq 0$.

6. The method of claim 4, wherein adjusting the constant value comprises reducing the constant value, N, to zero, when the value of the internal bit-depth increase, $B_d$, is greater than the constant value, such that $(N-B_d) < 0$.

7. The method of claim 1, further comprising applying an offset to the transform output signal prior to right-shifting the transform output signal by the number of bits equal to the constant value after the fixed-point transform.

8. The method of claim 7, wherein the constant value is equal to N, and wherein applying an offset to the transform output signal comprises applying an offset equal to $2^{N-1}$ to the transform output signal.

9. The method of claim 7, further comprising combining the offset and right-shift for the variable localized bit-depth increase with other offsets and right-shifts applied to the transform output signal.

10. The method of claim 1, wherein each of the plurality of pre-calculated constant values, N, is pre-calculated to satisfy $B_i + B_{TR} N \leq Z$, wherein $B_i$ is the input bit-depth value of the video signal, $B_{TR}$ is the transform bit-depth value associated with the one of the plurality of different transform sizes, and Z is the transform bit-precision value associated with the one of the plurality of different transform sizes.

11. The method of claim 1, wherein the plurality of different transform sizes comprises one or more of square transform sizes or rectangular transform sizes.

12. The method of claim 11, wherein the plurality of different transform sizes comprises one or more of a 4×4 transform, a 4×8 transform, a 8×4 transform, a 8×8 transform, a 8×16 transform, a 16×8 transform, a 16×16 transform, a 16×32 transform, a 32×16 transform, a 32×32 transform, a 32×64 transform, a 64×32 transform, a 64×64 transform, a 64×128 transform, a 128×64 transform, or a 128×128 transform.

13. The method of claim 1, the method being executable on a wireless communication device including the video coding device, the wireless communication device comprising:
a memory disposed within the video coding device to store the plurality of pre-calculated constant values;
a receiver configured to receive an encoded video signal;
a processor configured to decode the received encoded video signal, select the constant value from the plurality of pre-calculated constant values stored in the memory, and apply the variable localized bit-depth increase indicated by the selected constant value to the decoded video signal at the fixed-point transform in the video coding device.

14. The method of claim 13, wherein the wireless communication device is a cellular telephone and the encoded video signal is received by the receiver and modulated according to a cellular communication standard.

15. The method of claim 1, wherein the fixed-point transform in the video coding device comprises a fixed-point implementation of a discrete cosine transform.

16. The method of claim 15, wherein the discrete cosine transform comprises a number of cascaded butterfly structures relative to the size of the discrete cosine transform.

17. A video coding device for coding a video signal, the video coding device comprising:
memory that stores a plurality of pre-calculated constant values, wherein each of the plurality of pre-calculated constant values indicates a variable localized bit-depth increase associated with one of a plurality of different transform sizes associated with video coding, and wherein each of the plurality of pre-calculated constant values is pre-calculated based on an input bit-depth value of the video signal, a transform bit-depth value associated with the one of the plurality of different transform sizes, and a transform bit-precision value associated with the one of the plurality of different transform sizes; and
a processor that selects a constant value from the plurality of pre-calculated constant values based on a size of a fixed-point transform in the video coding device, and applies, at the fixed-point transform, the variable localized bit-depth increase indicated by the selected constant value by left-shifting a transform input signal by a number of bits equal to the constant value before the fixed-point transform, and right-shifting a transform output signal by a number of bits equal to the constant value after the fixed-point transform.

18. The video coding device of claim 17, wherein the video coding device comprises a video encoding device, the video encoding device further comprising an entropy encoding unit that encodes the video signal.

19. The video coding device of claim 17, wherein the video coding device comprises a video decoding device, the video decoding device further comprising an entropy decoding unit that decodes the video signal.

20. The video coding device of claim 17, wherein the fixed-point transform comprises a two dimensional fixed-point transform, and wherein the processor selects the constant value based on a size of one stage of the two dimensional fixed-point transform, doubles the constant value, and applies the variable localized bit-depth increase at the two dimensional fixed-point transform with a value less than or equal to the doubled constant value.

21. The video coding device of claim 17, wherein the processor:
determines whether an internal bit-depth increase is applied to the video signal;
when the internal bit-depth increase is applied to the video signal, adjusts the constant value based on a value of the internal bit-depth increase; and
applies the variable localized bit-depth increase at the fixed-point transform with a value equal to the adjusted constant value.

22. The video coding device of claim 21, wherein the processor adjusts the constant value by reducing the constant value, N, by the value of the internal bit-depth increase, $B_d$, such that the adjusted constant value is equal to $N-B_d$.

23. The video coding device of claim 22, wherein the processor reduces the constant value, N, by the value of the internal bit-depth increase, $B_d$, when the value of the internal bit-depth increase is less than or equal to the constant value, such that $(N-B_d) \geq 0$.

24. The video coding device of claim 22, wherein the processor reduces the constant value, N, to zero when the value of the internal bit-depth increase, $B_d$, is greater than the constant value, such that $(N-B_d)<0$.

25. The video coding device of claim 17, wherein the processor applies an offset to the transform output signal prior to right-shifting the transform output signal by the number of bits equal to the constant value after the fixed-point transform.

26. The video coding device of claim 25, wherein the constant value is equal to N, and wherein the processor applies an offset equal to $2^{N-1}$ to the transform output signal.

27. The video coding device of claim 25, wherein the processor combines the offset and right-shift for the variable localized bit-depth increase with other offsets and right-shifts applied to the transform output signal.

28. The video coding device of claim 17, wherein each of the plurality of pre-calculated constant values, N, is pre-calculated to satisfy $B_i+B_{TR} \leq Z$, wherein $B_i$ is the input bit-depth value of the video signal, $B_{TR}$ is the transform bit-depth value associated with the one of the plurality of different transform sizes, and Z is the transform bit-precision value associated with the one of the plurality of different transform sizes.

29. The video coding device of claim 17, wherein the plurality of different transform sizes comprises one or more of square transform sizes or rectangular transform sizes.

30. The video coding device of claim 29, wherein the plurality of different transform sizes comprises one or more of a 4×4 transform, a 4×8 transform, a 8×4 transform, a 8×8 transform, a 8×16 transform, a 16×8 transform, a 16×16 transform, a 16×32 transform, a 32×16 transform, a 32×32 transform, a 32×64 transform, a 64×32 transform, a 64×64 transform, a 64×128 transform, a 128×64 transform, or a 128×128 transform.

31. The video coding device of claim 17, wherein the video coding device is a wireless communication device, further comprising a receiver configured to receive an encoded video signal, wherein the processor is configured to decode the received encoded video signal, and apply the variable localized bit-depth increase indicated by the selected constant value to the decoded video signal at the fixed-point transform in the video coding device.

32. The video coding device of claim 31, wherein the wireless communication device is a cellular telephone and the encoded video signal is received by the receiver and modulated according to a cellular communication standard.

33. The video coding device of claim 17, wherein the fixed-point transform in the video coding device comprises a fixed-point implementation of a discrete cosine transform.

34. The method of claim 33, wherein the discrete cosine transform comprises a number of cascaded butterfly structures relative to the size of the discrete cosine transform.

35. A video coding device for coding a video signal, the video coding device comprising:
means for storing a plurality of pre-calculated constant values, wherein each of the plurality of pre-calculated constant values indicates a variable localized bit-depth increase associated with one of a plurality of different transform sizes associated with video coding, and wherein each of the plurality of pre-calculated constant values is pre-calculated based on an input bit-depth value of the video signal, a transform bit-depth value associated with the one of the plurality of different transform sizes, and a transform bit-precision value associated with the one of the plurality of different transform sizes;
means for selecting a constant value from the plurality of pre-calculated constant values based on a size of a fixed-point transform in the video coding device; and
means for applying, at the fixed-point transform, the variable localized bit-depth increase indicated by the selected constant value by left-shifting a transform input signal by a number of bits equal to the constant value before the fixed-point transform, and right-shifting a transform output signal by a number of bits equal to the constant value after the fixed-point transform.

36. The video coding device of claim 35, wherein the fixed-point transform comprises a two dimensional fixed-point transform, further comprising:
means for selecting the constant value based on a size of one stage of the two dimensional fixed-point transform;
means for doubling the constant value; and
means for applying the variable localized bit-depth increase at the two dimensional fixed-point transform with a value less than or equal to the doubled constant value.

37. The video coding device of claim 35, further comprising:
means for determining whether an internal bit-depth increase is applied to the video signal;

means for adjusting the constant value based on a value of the internal bit-depth increase when the internal bit-depth increase is applied to the video signal; and means for applying the variable localized bit-depth increase at the fixed-point transform with a value equal to the adjusted constant value.

38. The video coding device of claim 35, further comprising means for applying an offset to the transform output signal prior to right-shifting the transform output signal by the number of bits equal to the constant value after the fixed-point transform.

39. The video coding device of claim 35, wherein the plurality of different transform sizes comprises one or more of square transform sizes or rectangular transform sizes.

40. A non-transitory computer-readable storage medium comprising instruction for coding a video signal that, upon execution in a processor, cause the processor to:

store a plurality of pre-calculated constant values, wherein each of the plurality of pre-calculated constant values indicates a variable localized bit-depth increase associated with one of a plurality of different transform sizes associated with video coding, and wherein each of the plurality of re-calculated constant values is pre-calculated based on an input bit-depth value of the video signal, a transform bit-depth value associated with the one of the plurality of different transform sizes, and a transform bit-precision value associated with the one of the plurality of different transform sizes;

select a constant value from the plurality of pre-calculated constant values based on a size of a fixed-point transform in a video coding device; and apply, at the fixed-point transform in the video coding device, the variable localized bit-depth increase indicated by the selected constant value by left-shifting a transform input signal by a number of bits equal to the constant value before the fixed-point transform, and right-shifting a transform output signal by a number of bits equal to the constant value after the fixed-point transform.

41. The non-transitory computer-readable storage medium of claim 40, wherein the fixed-point transform comprises a two dimensional fixed-point transform, wherein the instructions cause the processor to:

select the constant value based on a size of one stage of the two dimensional fixed-point transform;

double the constant value; and apply the variable localized bit-depth increase at the two dimensional fixed-point transform with a value less than or equal to the doubled constant value.

* * * * *